July 5, 1966  H. C. LEHDE ETAL  3,259,225
MARSHALLING APPARATUS
Original Filed Feb. 16, 1960  17 Sheets-Sheet 1
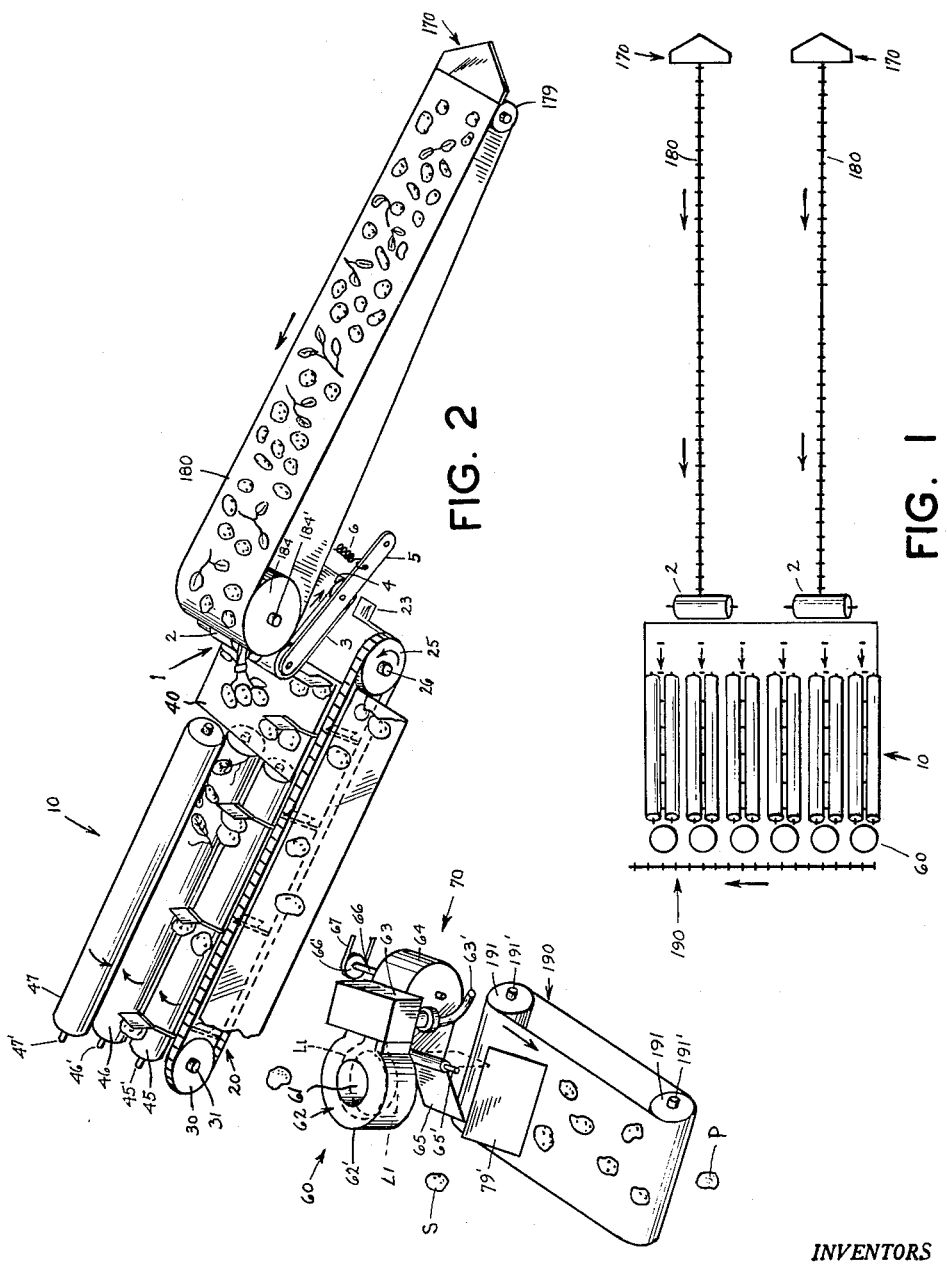
INVENTORS
Henry C. Lehde
John J. Dickerman
BY
Reuben J. Carlson
Attorney

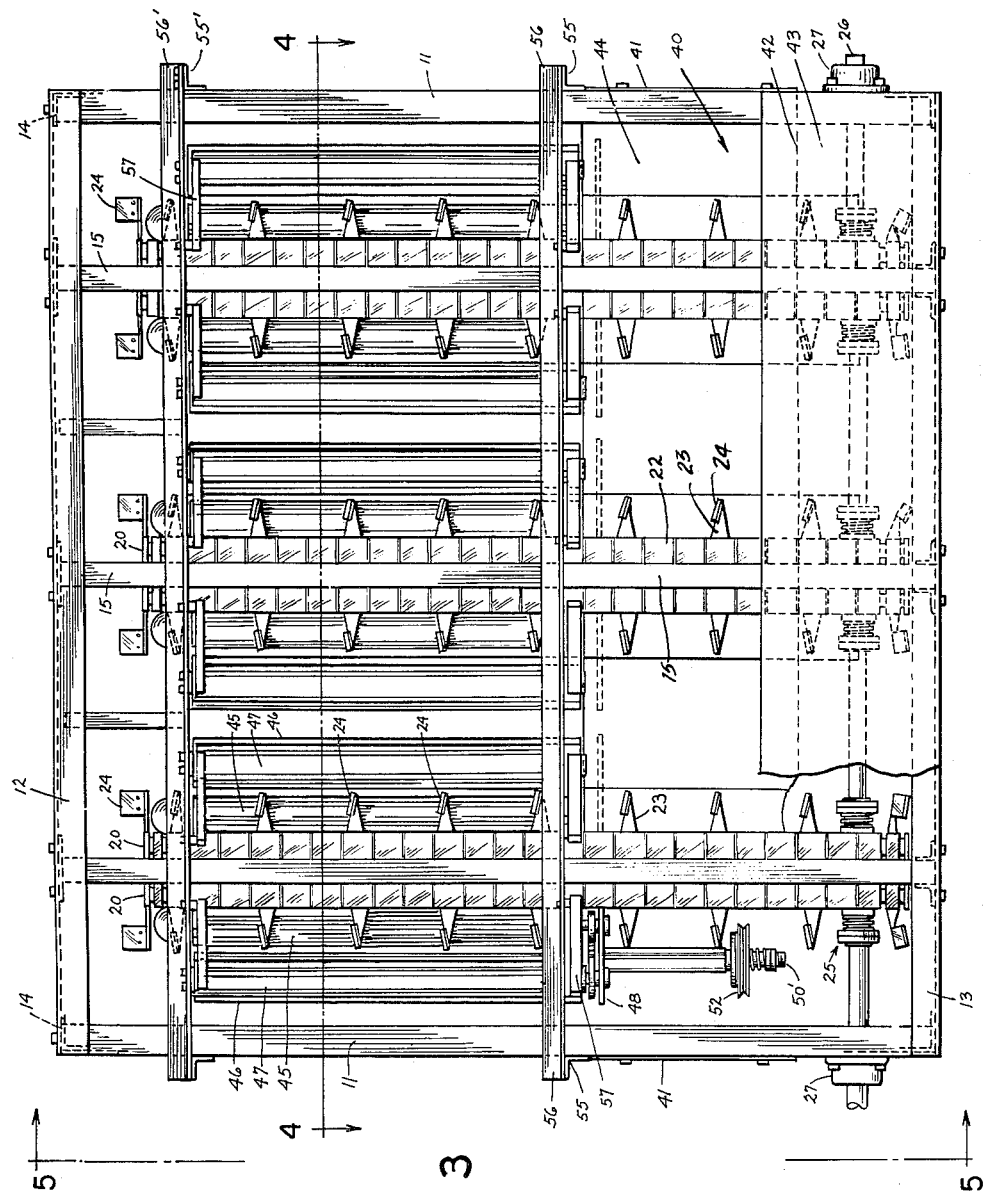

July 5, 1966  H. C. LEHDE ETAL  3,259,225
MARSHALLING APPARATUS
Original Filed Feb. 16, 1960  17 Sheets-Sheet 3

INVENTORS
Henry C. Lehde
John J. Dickerman
BY
Reuben J. Carlson
Attorney

July 5, 1966  H. C. LEHDE ETAL  3,259,225

MARSHALLING APPARATUS

Original Filed Feb. 16, 1960  17 Sheets-Sheet 4

INVENTORS
Henry C. Lehde
John J. Dickerman
BY
Reuben J. Carlson
Attorney

July 5, 1966  H. C. LEHDE ETAL  3,259,225

MARSHALLING APPARATUS

Original Filed Feb. 16, 1960  17 Sheets-Sheet 5

INVENTORS
Henry C. Lehde
John J. Dickerman

BY Reuben D. Carlson

Attorney

July 5, 1966  H. C. LEHDE ETAL  3,259,225
MARSHALLING APPARATUS
Original Filed Feb. 16, 1960  17 Sheets-Sheet 6

INVENTORS
Henry C. Lehde
John J. Dickerman
BY
Reuben J. Carlson
Attorney

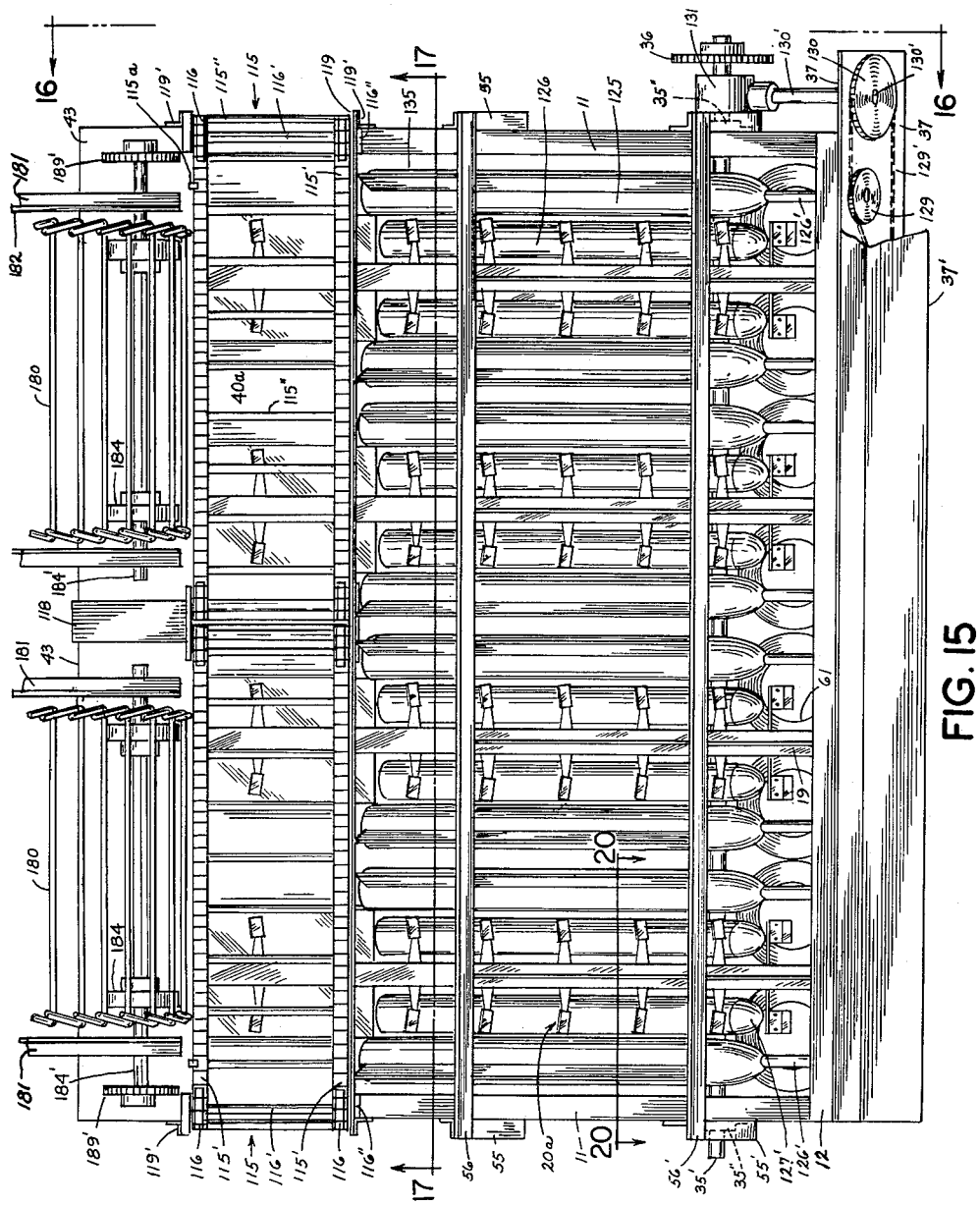

INVENTORS
Henry C Lehde
John J. Dickerman
BY
Reuben J. Carlson
Attorney

July 5, 1966 H. C. LEHDE ETAL 3,259,225
MARSHALLING APPARATUS
Original Filed Feb. 16, 1960 17 Sheets-Sheet 9
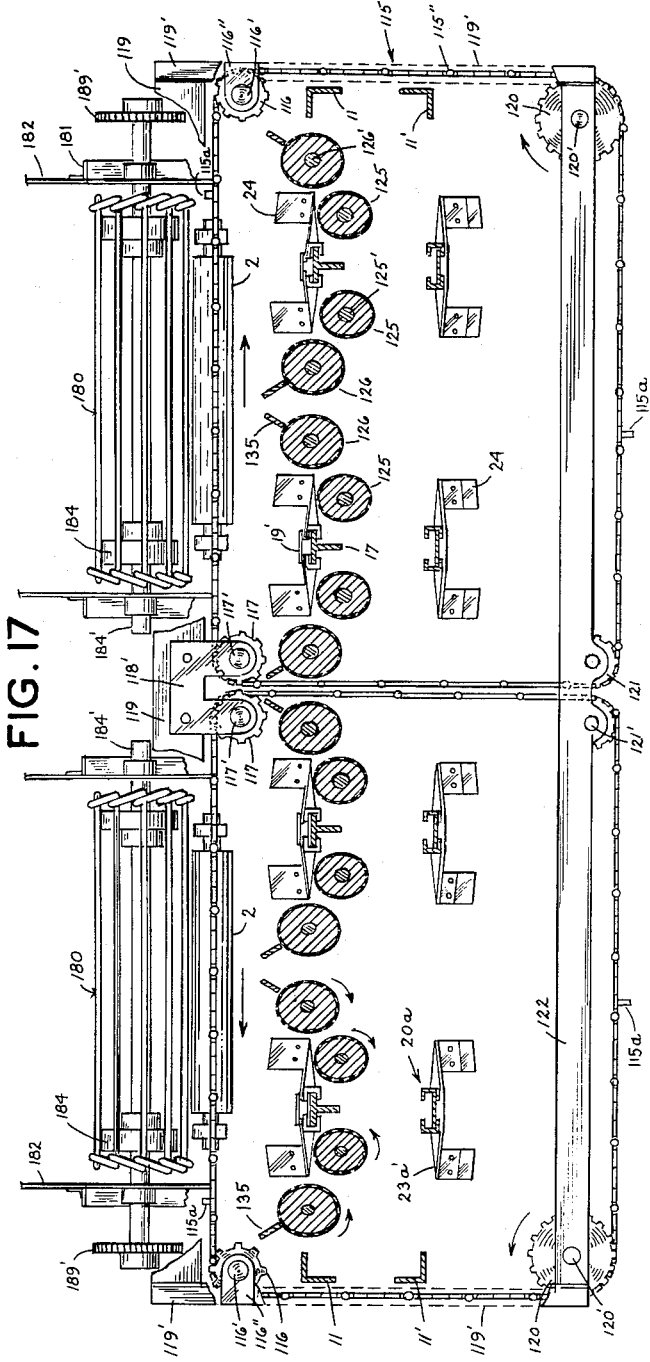
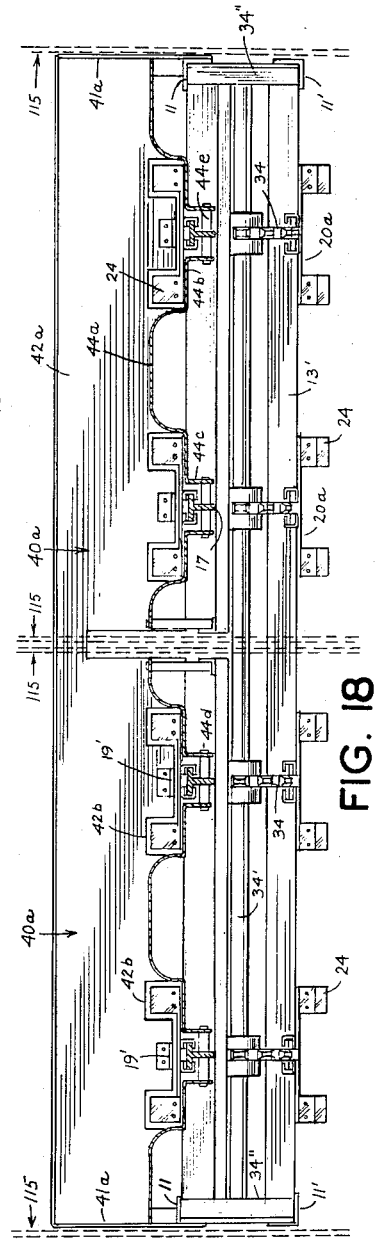
INVENTORS
Henry C. Lehde
John J. Dickerman
BY
Reuben J. Carlson
Attorney July 5, 1966   H. C. LEHDE ET AL   3,259,225
MARSHALLING APPARATUS
Original Filed Feb. 16, 1960   17 Sheets-Sheet 11

INVENTORS
Henry C. Lehde
John J. Dickerman
BY
Reuben J. Carlson
Attorney

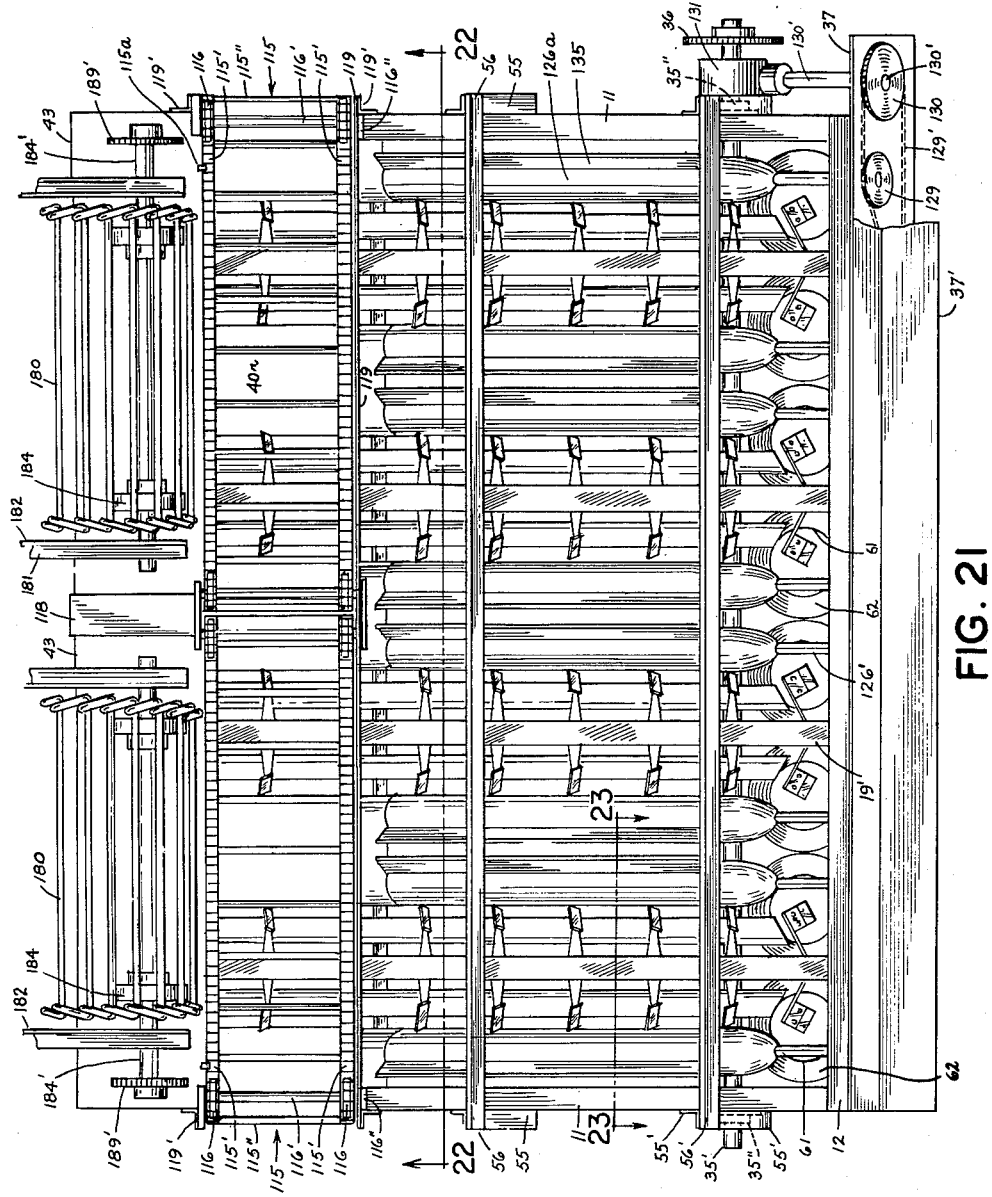

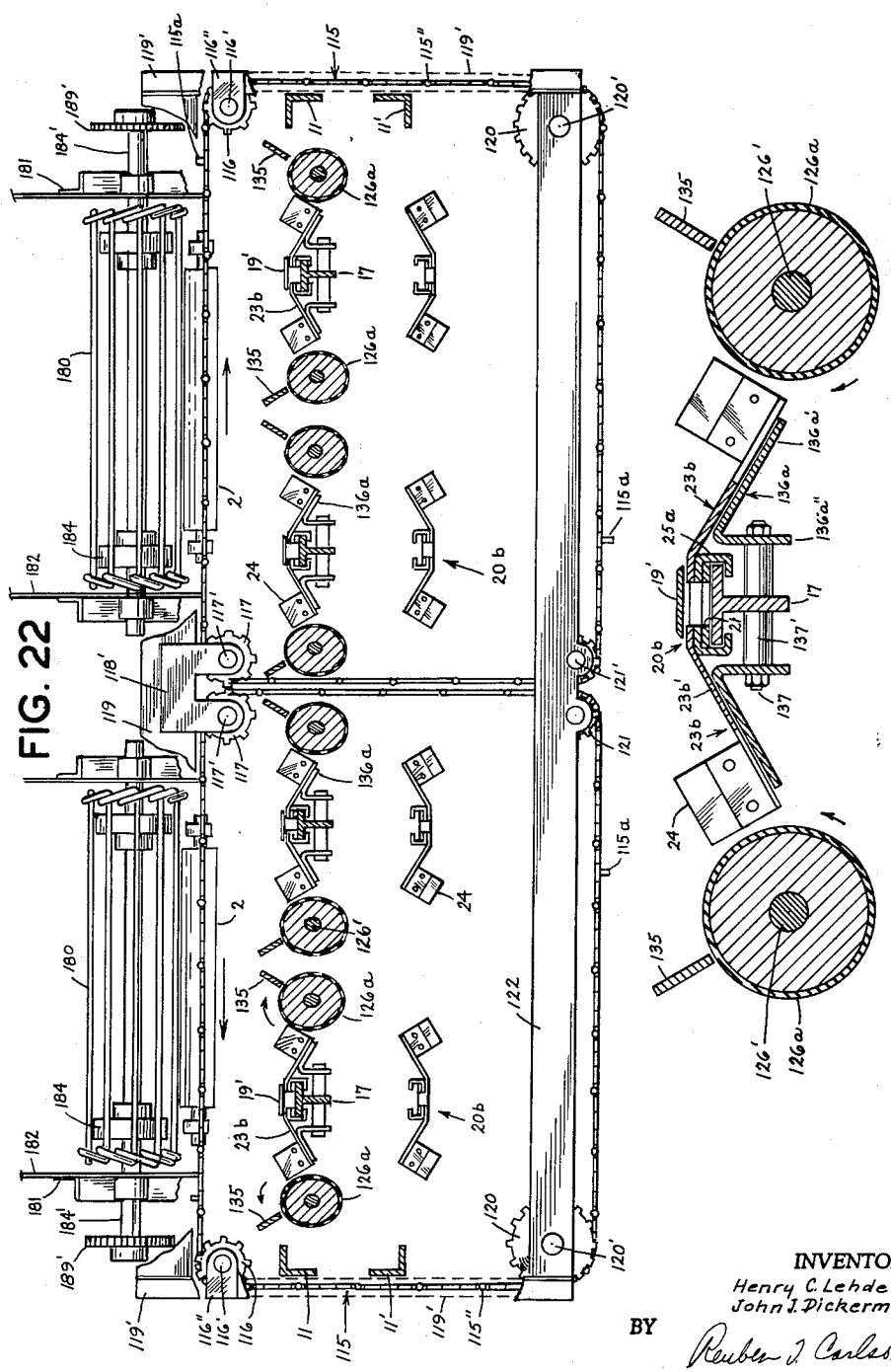

July 5, 1966  H. C. LEHDE ETAL  3,259,225
MARSHALLING APPARATUS
Original Filed Feb. 16, 1960  17 Sheets-Sheet 14

INVENTORS
Henry C. Lehde
John J. Dickerman
BY
Reuben J. Carlson
Attorney

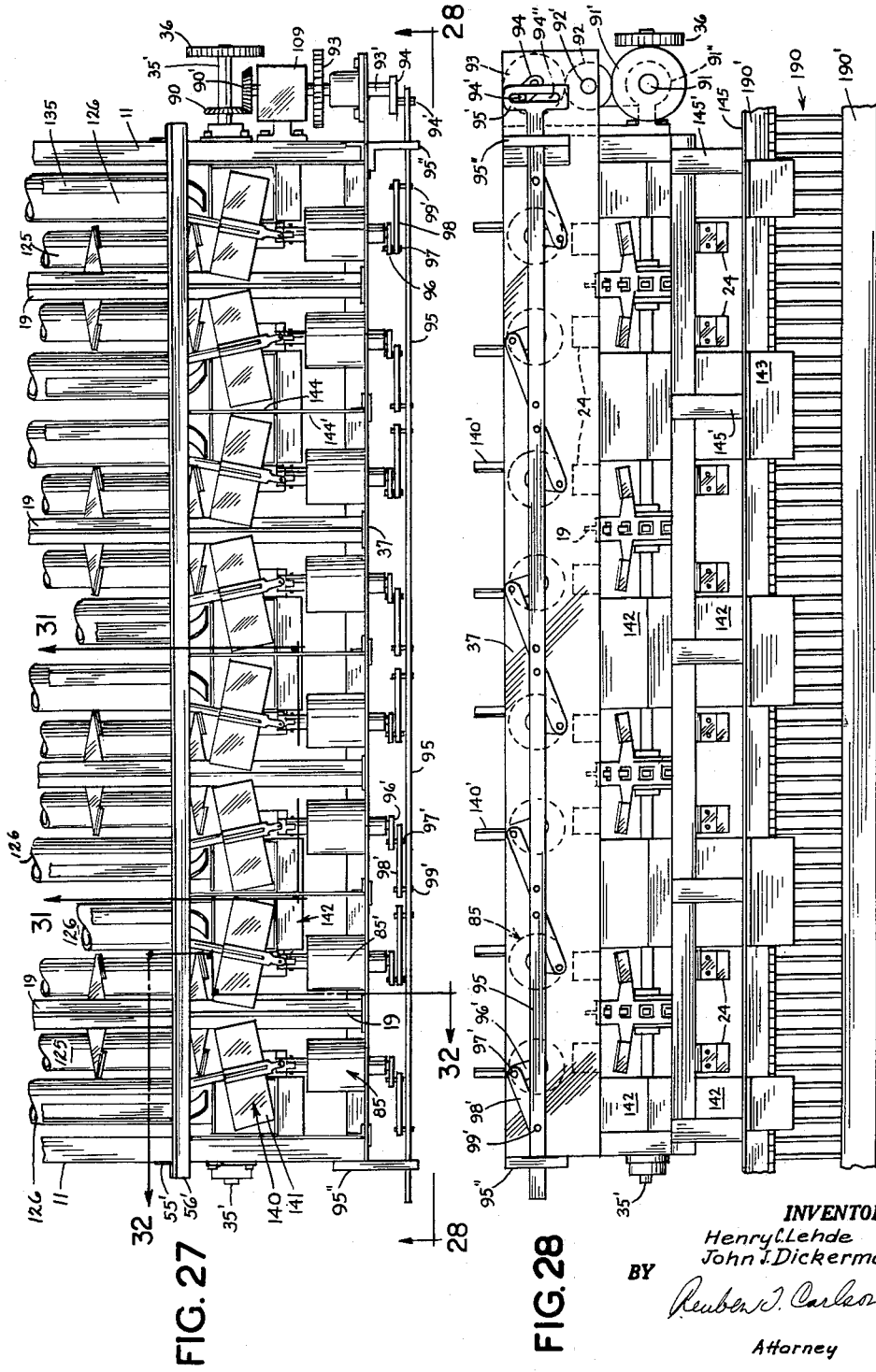

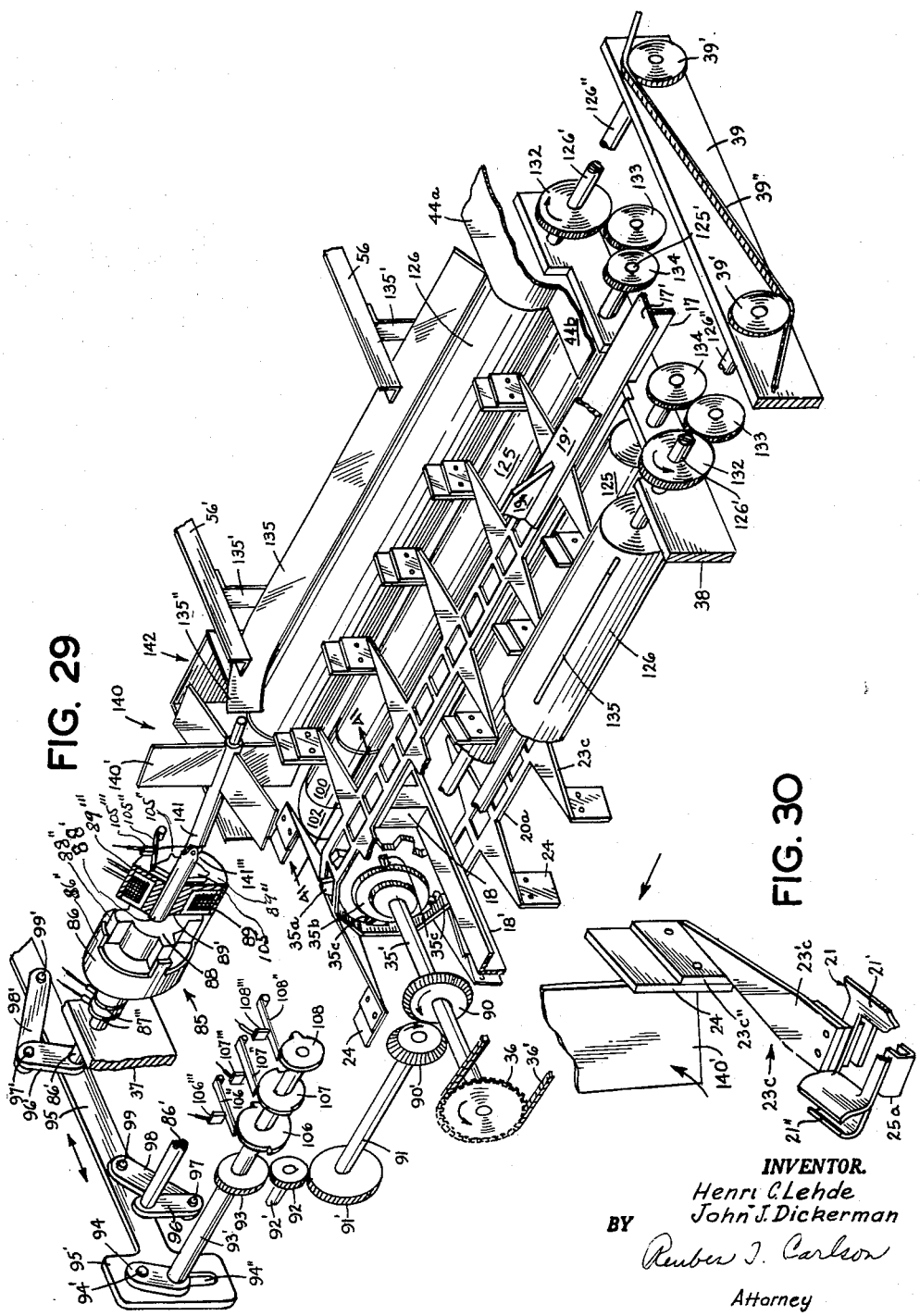

July 5, 1966  H. C. LEHDE ETAL  3,259,225
MARSHALLING APPARATUS
Original Filed Feb. 16, 1960  17 Sheets-Sheet 17
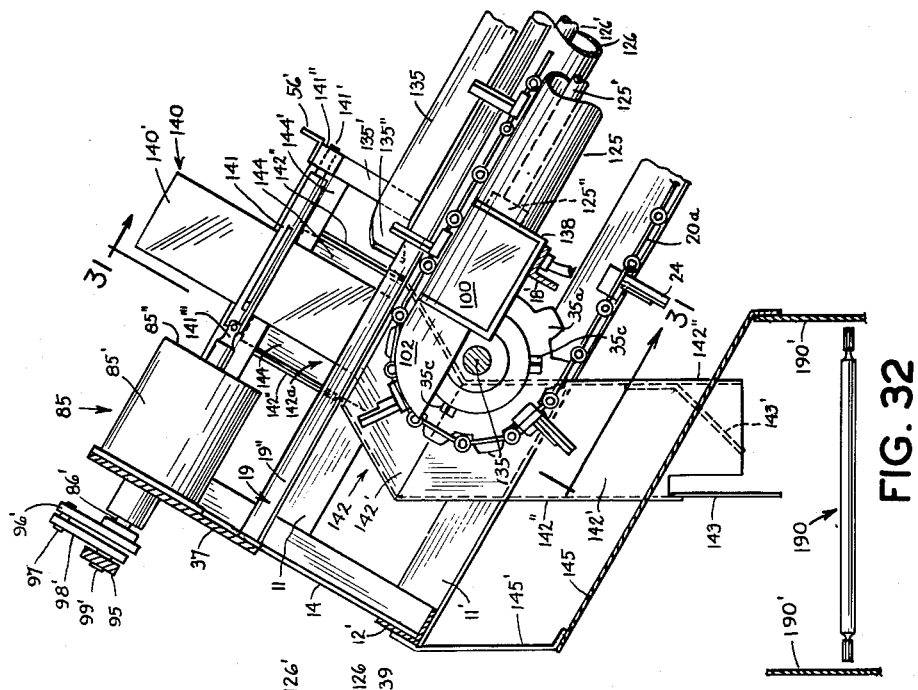
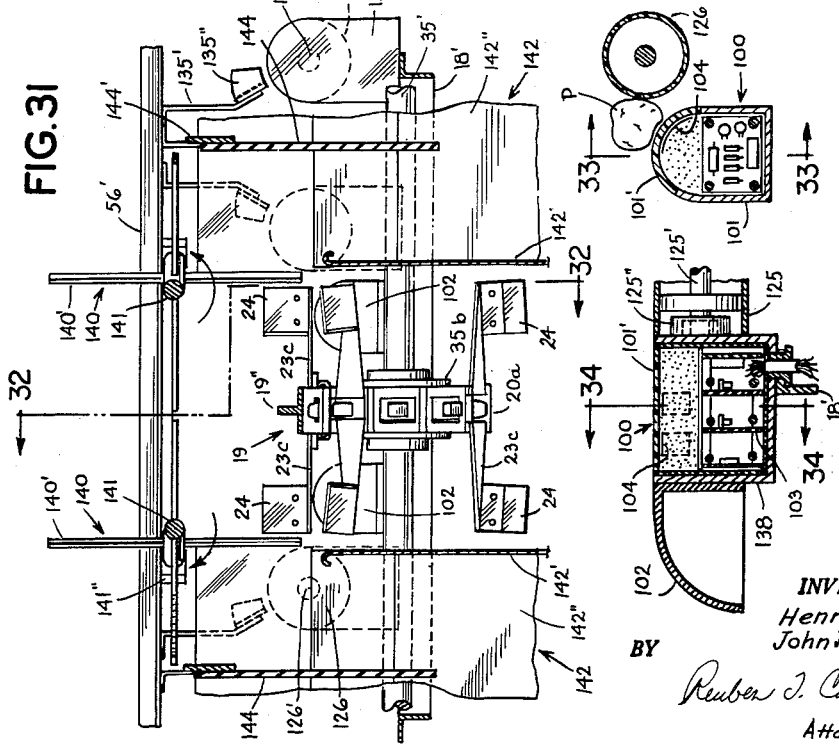
INVENTOR.
Henry C. Lehde
John J. Dickerman
BY
Reuben J. Carlson
Attorney

3,259,225
MARSHALLING APPARATUS
Henry C. Lehde, Northport, N.Y. (P.O. Box 415, Midway City, Calif.), and John J. Dickerman, 22 Oak St., Northport, N.Y.
Original application Feb. 16, 1960, Ser. No. 8,649, now Patent No. 3,200,888, dated Aug. 17, 1965. Divided and this application Feb. 25, 1963, Ser. No. 268,209
17 Claims. (Cl. 198—30)

This invention relates to Marshalling Apparatus, and more particularly to improved apparatus for marshalling a mixture of objects or articles into a single file column or columns and advancing the columnized articles in individually spaced order and in condition for convenient and rapid classification and separation into classes or groups of different characteristics. This application is a division of our copending application Serial No. 8,649 filed February 16, 1960, now Patent No. 3,200,888, issued August 17, 1965.

The reliable and efficient separation and classification of a mixture of relatively solid articles, objects and products into predetermined groups or classes in accordance to size, shape, composition or other inherent characteristics, often requires that the mixed objects be first marshalled into single file columns and advanced in uniformly spaced order to sensing and classifying mechanism of the processing system. In such processing systems, the article marshalling and advancing apparatus should also be capable of sifting out and removing undesired debris attached to or entrained with the articles prior to classification thereof. For example, in the processing or harvesting of fruit and root produce, such as potatoes, sugar beets, turnips, onions and like underground produce, or apples, oranges, peaches and like crops grown above ground, the objects or produce often have entrained therewith or clinging thereto, underised vegetation, stems, twigs or vines, and/or stones, hard lumps and soil clinging thereto, which should be removed prior to classification of the objects or produce.

It is the purpose of this invention to provide apparatus for efficiently and reliably marshalling and advancing a mixture of articles or objects of varying size, shape and composition into a column or columns traveling in single file and individually spaced order.

A further purpose of this invention is to provide improved apparatus for marshalling and advancing an assortment of objects in single file columns and in uniformly spaced order, and during such advance to sift out and remove undesired debris entrained therewith or clinging thereto.

While the marshalling apparatus of this invention is uniquely adapted for aligning and advancing a mixture of relatively solid organic or inorganic articles, objects or products of varying size, shape and composition into single file and spaced order preparatory to processing into predetermined groups or classes, this invention will be exemplified in the following description to the marshalling of a mixture of potatoes, stones, clods and sod in single file and individually spaced order to insure effective classification and separation of the desired potatoes from the undesired stones, clods and sods mixed therewith.

The harvesting of potatoes in an economical manner by machine operation presents numerous difficult and varied problems, resulting from variable field conditions under which the mechanical harvester must operate. Many sandy and gravelly soils especially suitable for potato growing, often contain numerous stones of various sizes which are excavated with the potatoes, and which should be promptly eliminated during the harvesting, to avoid bruising damage to the harvested potatoes. When the harvesting must be performed when the soil is dry and hard, or under other unfavorable soil or climatic conditions, soil lumps and clods are often excavated with the potatoes of such hardness that they will not crumble during normal conveyor handling, and should be eliminated during the harvesting process if potato bruising is to be avoided. Many potato fields at the time of harvesting are also contaminated with tenacious sod and weed root growth, which is excavated with the potatoes and which should also be separated and discarded during the harvesting process.

The marshalling apparatus of this invention is particularly adapted for mounted association with self-propelled root and potato harvesters, provided with one or more digging or excavating shovels which transfer the excavated material on to a primary sifting conveyor which sifts out soil, stones, sod and other debris which is smaller in size than the size range of the root crop to be gathered; followed by a primary deviner for removing the stripping out above-ground growth and vines from the product stream. The harvester is also desirably provided with a secondary sifting conveyor extending transversely of the harvester and operative to sift from the product stream, such stones, clods and sod which are larger than the largest size root product or object to be gathered.

The product stream is discharged from the secondary sifting conveyor into a collecting area of bin, and may be composed of a mixture of potatoes and remaining debris such as stones, hard clods and sod of the same size range as the root crop to be gathered and not previously eliminated.

The marshalling apparatus of this invention may be constructed as an integrated mechanism which can be mounted on the framework structure of the harvester, for conveying and marshalling the potatoes and stones, clods and sods of similar size from the receiving bin to the rear end of the harvester, in a series of single file columns, and in a manner which permits the selective elimination of the stones, clods and sods from the potato stream. The marshalling system includes a series of columnized advancing paddles connected to and advanced by one or more driven chains or belts. The paddles in each paddle column are arranged in linear spaced relation, and each paddle presents an object advancing face designed to positively advance only a single potato, stone or clod in an upwardly inclined longitudinal direction toward the rear end of the harvester.

One or more tumbling rolls are arranged in operative association with each paddle column, and which provides partial or total support for the objects advanced by the linearly spaced paddles. Each of the columnized advancing paddles operates to withdraw one or more objects from the receiving bin, and advance the same in tumbling contact with the associated rotating marshalling roll or rolls. Each columnized advancing paddle is so shaped and dimensioned as to support only a single object on the advancing face thereof as the paddle reaches the upper end of its travel. If more than one object is initially engaged by an advancing paddle, the extra object is tumbled laterally from the advancing influence of the paddle for return to the receiving bin for subsequent pick-up. The tumbling movement to which the objects are subjected during their columnized upward travel through the marshalling system, serves to break off any soil which may still cling thereto.

Where only a single marshalling roll is employed in association with each paddle column, the marshalling roll may be positioned directly under the line of travel of the columnized paddles to provide tumbling support for the objects advanced thereby. Alternatively, the marshalling roll may be positioned to extend along one side of the line of travel of the columnized paddles to effectuate tumbling of the objects, with a stationary supporting plate positioned under the paddles to provide support for the paddle advanced objects. Alternatively, a pair of tumbling rolls may be associated with each paddle column to provide tumbling support for the paddle advanced objects. Longitudinally extending baffle plates may be provided to assist the channelization of the advancing objects into linearized columns. Where vines and other growth debris is so prolific that the same cannot be adequately eliminated by a primary deviner, a secondary devining roll in riding association with the tumbling roll may be provided to insure complete removal of remaining vine and growth debris.

When the mixed articles or objects have been arranged in single file columns and individually spaced relation by the combined action of the advancing paddles and marshalling rolls, mechanism positioned adjacent the discharge end of each column may be provided, which is operative to selectively detect the characteristics of the individually advanced objects and thereupon separate them into the desired classifications.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof in which:

FIG. 1 is a flow diagram illustrating the direction of travel of the potatoes and debris materials processed along and through the various components of the harvester.

FIG. 2 is a diagrammatic illustration in perspective of one version of the present invention, showing the principles of the potato or article marshalling arrangement, and one form of the sensing and classifying mechanism which may be associated therewith;

FIG. 3 is a plan view showing further details of the object marshalling and advancing assembly, certain parts being broken away to reveal further details;

Figure 14:
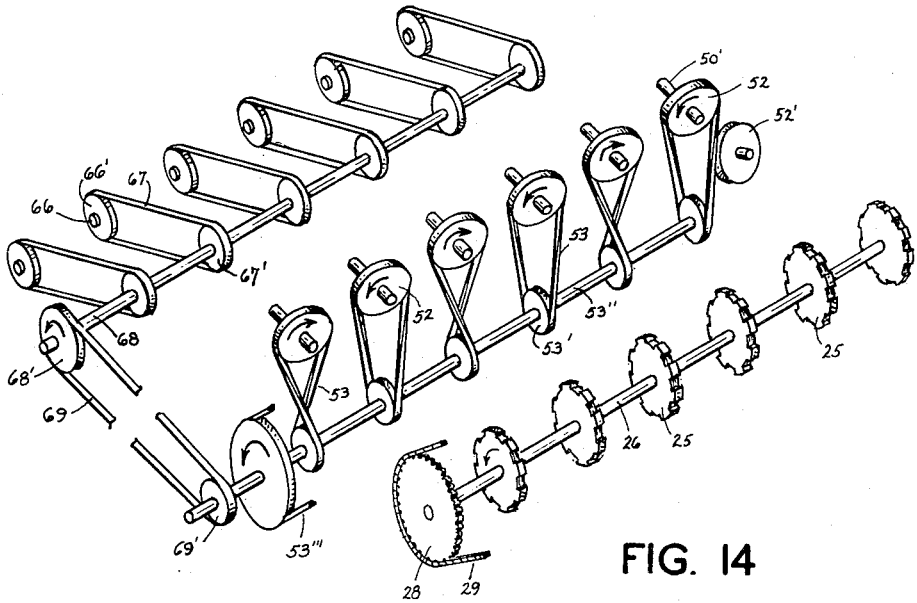
Figure 14A:
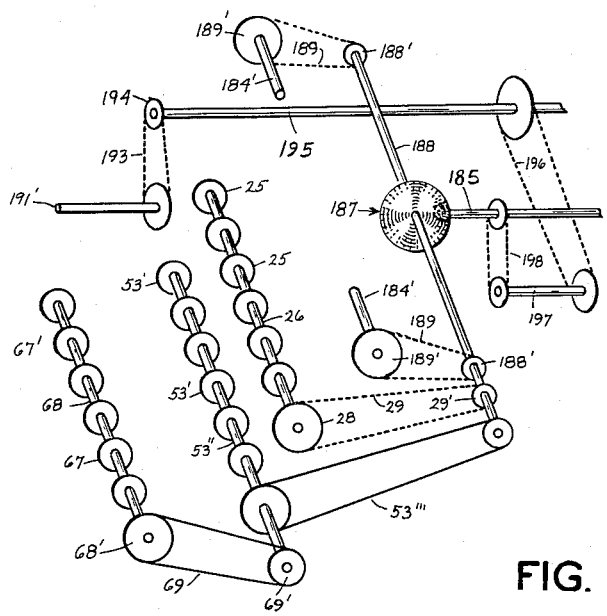

FIG. 14 is a diagrammatic perspective view of the sprocket assembly which drives the marshalling chains and paddles, and adjacent thereto the pulley and V-belt assemblies which drive the object marshalling and tumbling rolls, and also the continuously driven shafts of the selector units; and FIG. 14A is a schematic diagram, which supplements the drive diagram shown in FIG. 14, and which illustrates the driving system which may be used for driving the marshalling chains, for rotating the tumbling and spinner rolls, and for driving the primary conveyor and the discharge conveyor from a single power source in operative synchronism.

Figure 16:
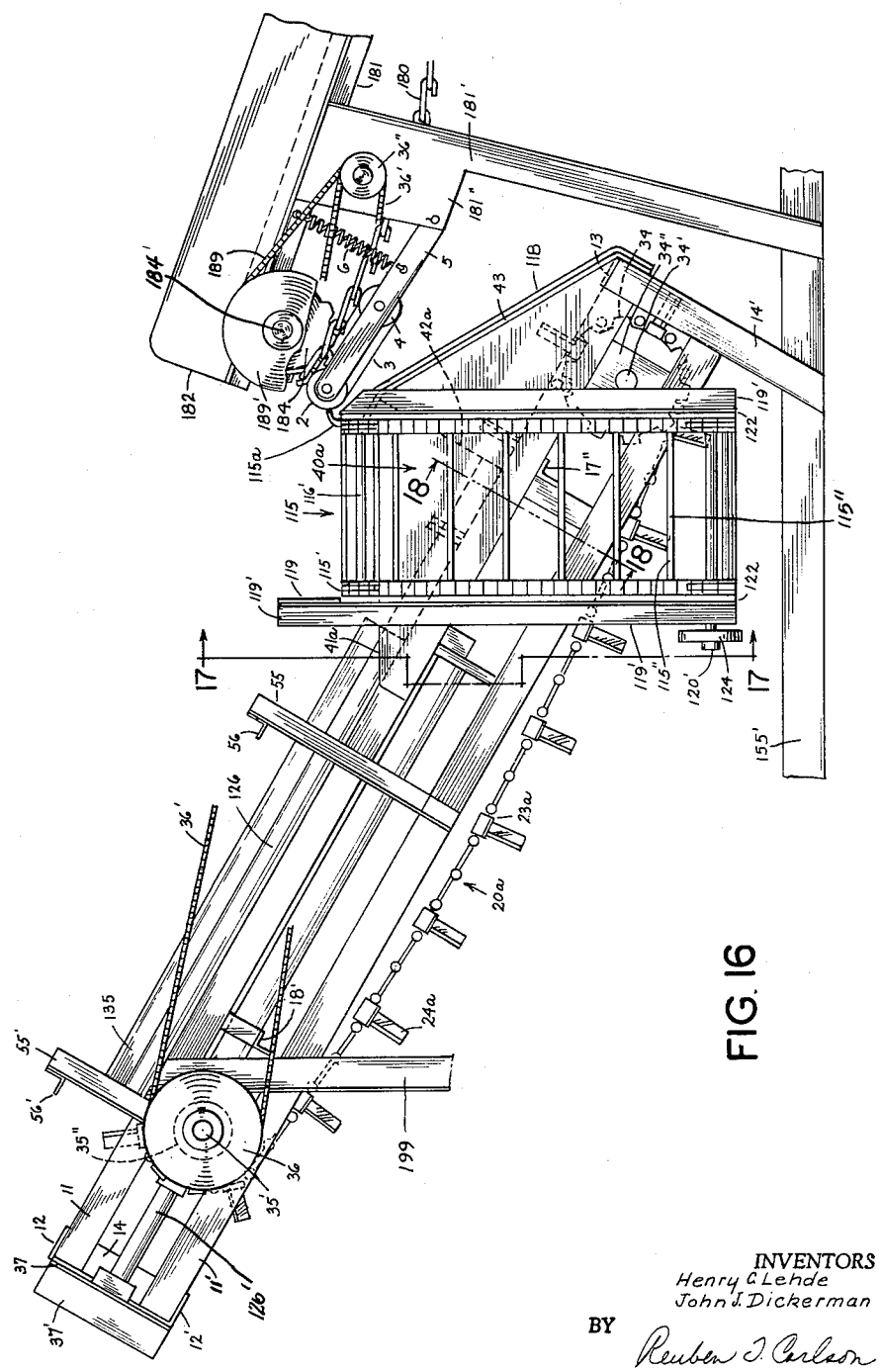
Figure 19:
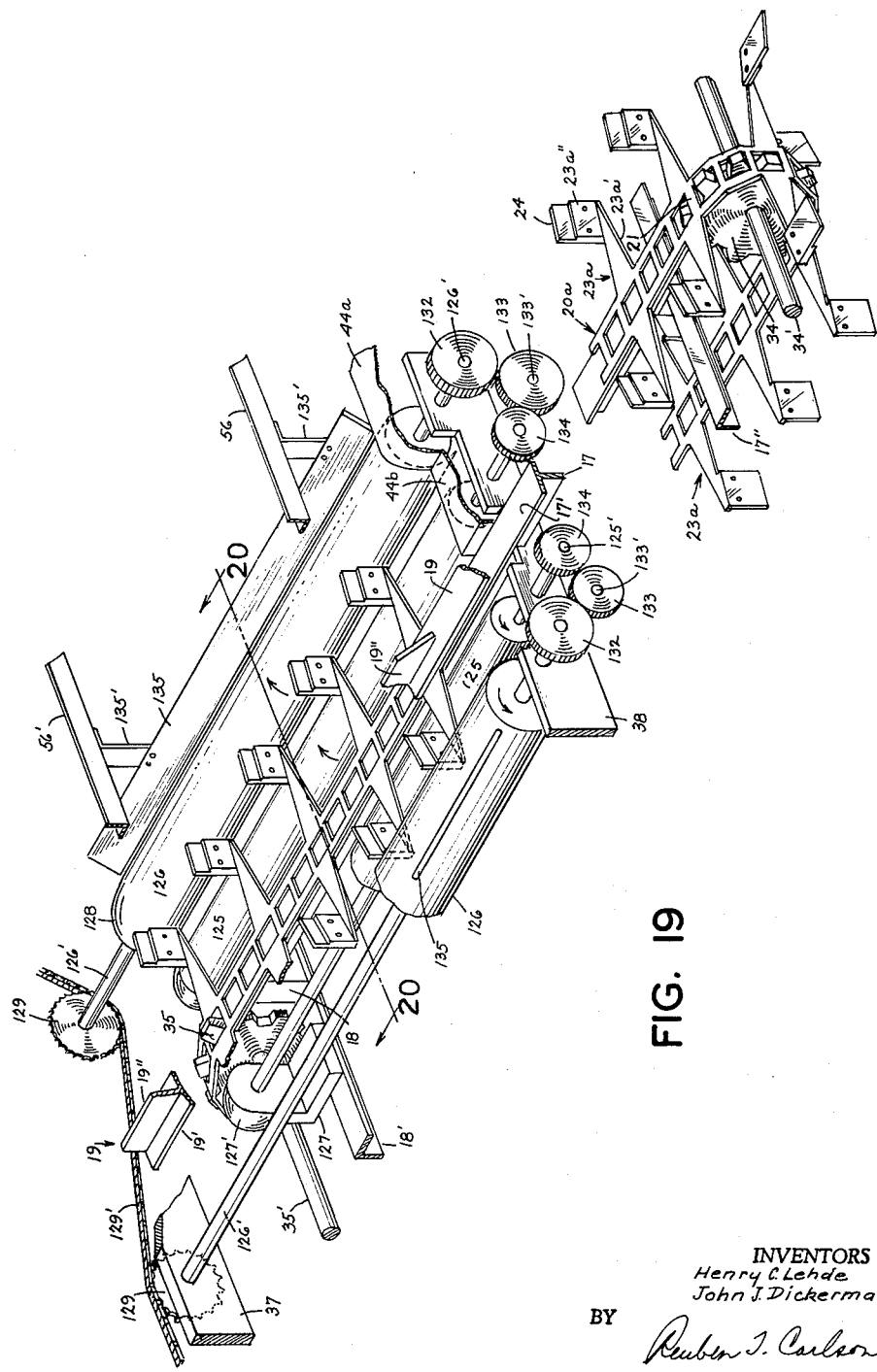
Figure 24:
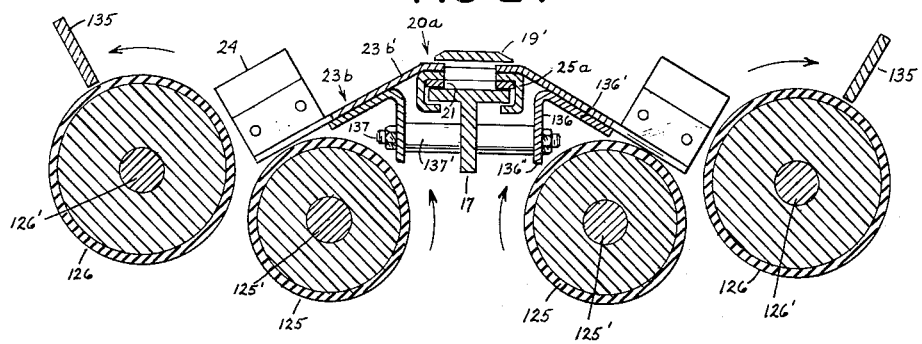
Figure 20:
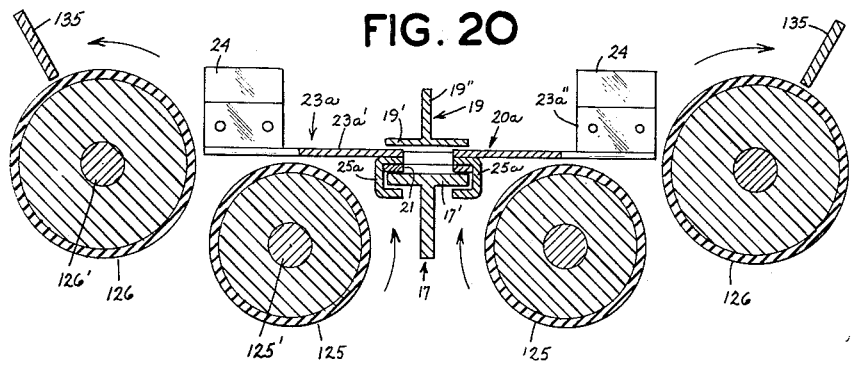
Figure 25:
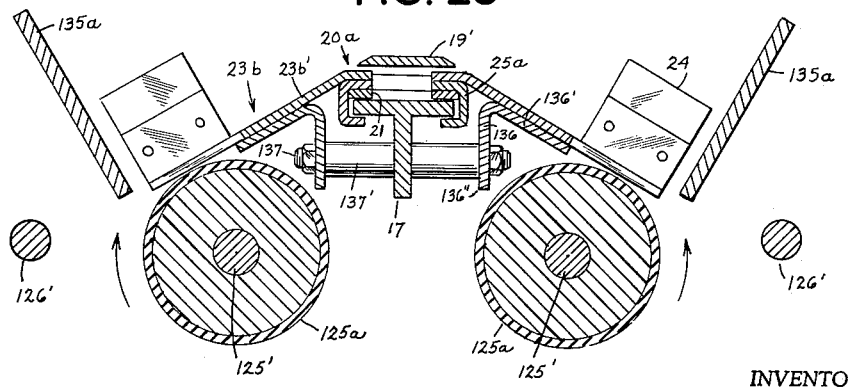

FIG. 15 is a plan view showing an alternative form of marshalling and tumbling assembly which embraces four duplex paddle equipped advancing chains driven from the upper ends thereof and designed to advance, marshall and tumble eight columns of objects between eight sets of paired marshalling and tumbling rolls which are also driven from the upper ends thereof;

FIG. 16 is a side elevational view of the alternative form of marshalling and tumbling assembly as viewed along line 16—16 of FIG. 15; this view also showing a fragmentary part of the upper end of the primary conveyor and associated primary deviner, a side view of the transverse sifting conveyor, the drop bin, and the drive means at the upper end of the marshalling and tumbling assembly;

FIG. 17 is a vertical transverse section taken along line 17—17 of FIGS. 15 and 16 and showing the discharge ends of the primary conveyors, a rear elevational view of the transverse sifting conveyors, transverse sections of the paddle equipped advancing chains, and paired sets of adjacent marshalling and tumbling rolls as arranged in cooperating relation to the advancing paddles;

FIG. 18 is a vertical transverse section of the lower end of the alternate form of marshalling and tumbling assembly as viewed along line 18—18 of FIG. 16, this view showing the drop bin, the lower ends of the marshalling chains and associated object advancing paddles, and the supporting sprockets therefor;

FIG. 19 is a fragmentary perspective view which illustrates further details of one of the smiliar duplex paddle equipped object advancing chains and the two adjacent pairs of cooperating marshalling and tumbling rolls as incorporated into the assembly shown in FIGS. 15, 16, 17 and 18;

FIG. 20 is an enlarged transverse section taken along line 20—20 of FIGS. 15 and 19, and which shows in further detail the construction of one of the similar paddle equipped advancing chains and the two adjacent sets of paired marshalling and tumbling rolls which cooperate therewith;

FIG. 21 is a plan view of a further alternative form of object marshalling and tumbling assembly which embraces four upwardly moving object advancing chains driven from the upper ends thereof, each chain being equipped with two laterally spaced columns of downwardly inclined object advancing paddles, each paddle column extending over a downwardly inclined object supporting plate and positioned in cooperative relation to a single tumbling roll driven from the upper end thereof;

FIG. 22 is a vertical transverse section taken along line 22—22 of FIG. 21, and showing the discharge ends of the primary conveyors, a rear elevational view of the transverse sifting conveyors, and transverse sections of the object advancing chains, each chain being equipped with two columns of object advancing paddles positioned in inclined relation to underlying object supporting plates and adjacent tumbling rolls;

FIG. 23 is an enlarged transverse section taken along line 23—23 of FIG. 21 and showing in further detail the construction of one of the similar object advancing chains and associated inclined paddles positioned in cooperating relation to the inclined object supporting plates and adjacent tumbling rolls; and FIG. 24 is an enlarged transverse section showing the construction of a further modified form of paddle equipped object advancing chain and adjacent sets of marshalling and tumbling rolls which are generally similar to that shown in FIG. 20 and designed for use in the assembly shown in FIGS. 15, 16, 17, 18 and 19; except that the associated paddles of this FIG. 24 are inclined and cooperate with inclined object supporting plates similar to that shown in FIG. 23; and except that the two sets of associated marshalling and tumbling rolls of the this FIG. 24 are similar to those shown in FIG. 15 after the rolls of FIG. 15 have been adjusted in position to accommodate the adjacent inclined object advancing paddles; and FIG. 25 is an enlarged transverse section showing the construction of a further modified form of a paddle equipped object advancing chain and tumbling roll assembly which is generally similar to that shown in FIG. 23 and designed for use in the assembly shown in FIG. 21, the individual tumbling rolls of this FIG. 25 being similar to those shown in FIG. 21 after the rolls and baffle plates of FIG. 21 have been adjusted in position to directly support the paired object columns, with the rolls driven in the opposite direction from that shown in FIG. 23.

Figure 26:
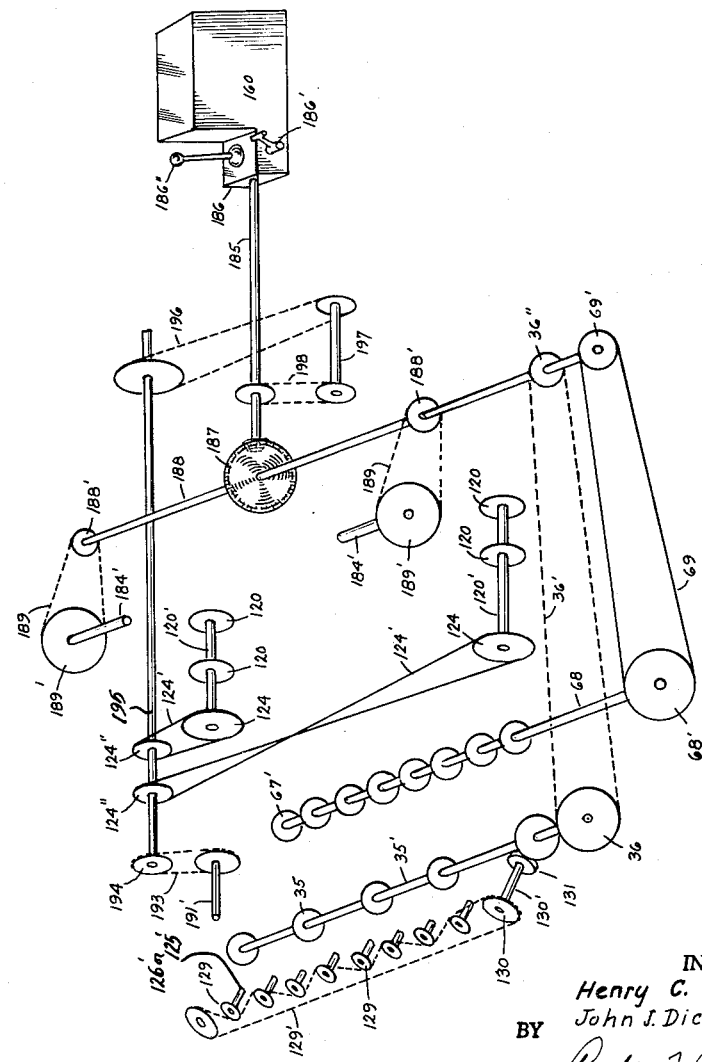

FIG. 26 is a schematic diagram showing the major power drives from a combustion engine to the primary conveyors, the discharge conveyor, and the series of alternative power drives which provide the driving connections for the transverse sifting conveyors, and the upper end drives for the alternative forms of potato marshalling chains and object marshalling and tumbling rolls shown in FIGS. 15–25.

FIG. 27 is a fragmentary plan view of the rear end of an object marshalling and tumbling assembly generally similar to that shown in FIG. 15, but equipped with an alternative form of separating mechanism, which includes an object sensing unit located at the end of one of the marshalling rolls in each advancing column, and a paddle wheel responsive to the object sensing unit, and operative to separate the objects into two classifications and deflect the same into separate receiving chutes;

FIG. 28 is a rear elevational view of the marshalling and selector assembly as viewed in the direction of the arrows along line 28—28 of FIG. 27, this view showing the mechanism for driving the object deflecting paddle wheels, and the discharge conveyor which receives one class of objects discharged from the marshalling apparatus;

FIG. 29 is a fragmentary perspective view which illustrates further details of the duplex paddle equipped advancing chain shown in FIGS. 27 and 28, with two adjacent pairs of cooperating marshalling and tumbling rolls, with an object sensing unit adjacent to the upper end of one of the paired rolls and contoured to the roll outline, and the object deflecting paddle wheel and associated driving clutch and brake unit which is operatively responsive to the sensing unit to selectively separate the objects into two classifications.

FIG. 30 is a perspective view of one of the modified advancing paddles associated with the advancing chain shown in FIG. 29, and a portion of the deflecting paddle wheel, and which illustrates by arrows the relative motions of the advancing paddle and the synchronized deflecting paddle which cooperate to laterally deflect the selected object from the end of the marshalling channel without interfering with the movement of the advancing paddle;

FIG. 31 is a fragmentary transverse section, taken along line 31—31 of FIGS. 27 and 32, this view showing the delivery end of the marshalling chain as shown in FIG. 29, its supporting sprocket, and associated duplex advancing paddles, and two of the deflecting paddle wheels, and portions of two adjacent selected object receiving chutes and a discarded object receiving chute therebetween;

FIG. 32 is a fragmentary longitudinal section taken along line 32—32 of FIGS. 27 and 31, and showing the delivery end of the marshalling and selecting mechanism of FIG. 27, the electromagnetic clutch and brake unit which drives the deflecting paddle wheel, the object sensing unit, the chute which receives the selected object, the discharge conveyor, and the rejected object deflecting cover extending over the selected object discharge conveyor;

FIG. 33 is a longitudinal section of a representative form of the object sensing unit as viewed along line 33—33 in FIG. 34, and showing the general components of the sensing unit and its mounting support, the adjacent end of the object tumbling roll and the rounded discharge nose associated therewith; and FIG. 34 is a transverse section of the object sensing unit as viewed along line 34—34 of FIG. 33, and showing the general arrangement of its components, its contoured insulating cover, and the adjacent object spinning roll.

Similar reference characters refer to similar parts throughout the several views of the drawings and specification.

The marshalling apparatus of this invention can be advantageously constructed as an integrated unit adapted to be stationarily positioned to form a component part of a plant or warehouse installed processing line, or mounted on the body of a traveling vehicle.

Figure 4:
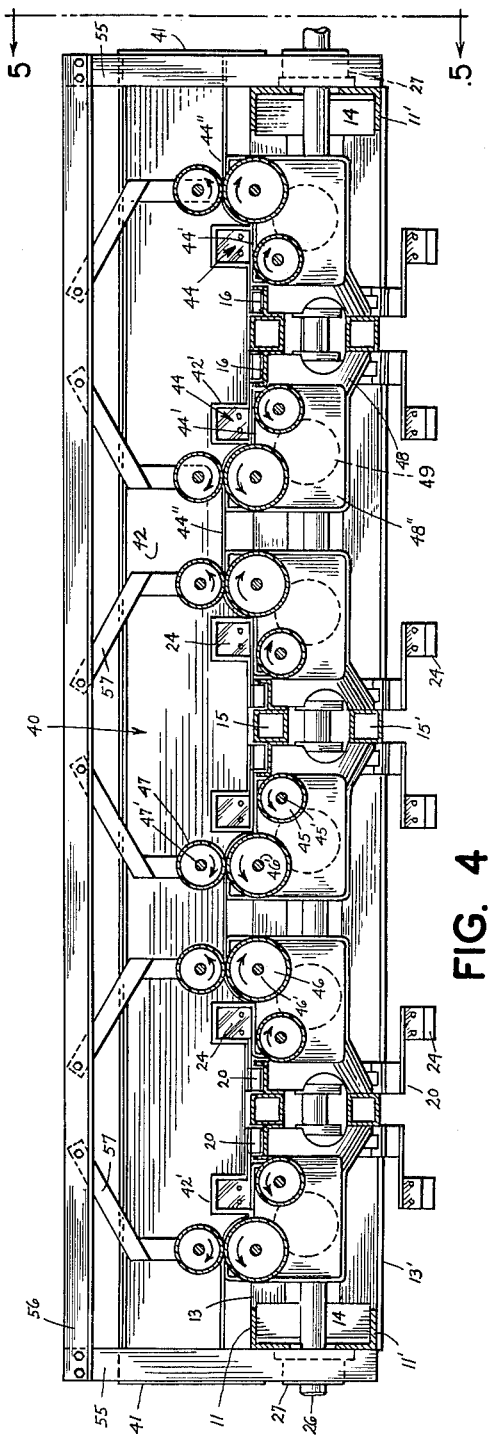
FIG. 4 is a transverse section taken through the object marshalling and advancing assembly as the same would appear when viewed along line 4—4 of FIG. 3.
Figure 5:
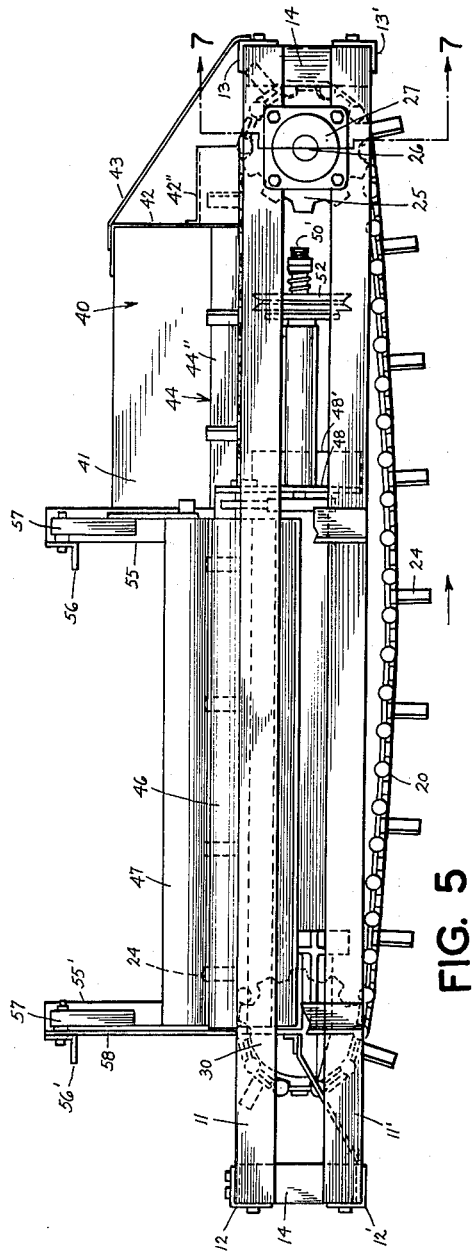
FIG. 5 is a side elevational view of the object marshalling and advancing assembly as the same would appear when viewed along line 5—5 of FIGS. 3 and 4.

The marshalling apparatus generally comprises an object marshalling and advancing assembly 10 as shown in FIGS. 3, 4 and 5, which operates to withdraw a mixture of objects of substantially different electrical conductivity from a receiving area or bin 40, marshall the withdrawn objects into one or more columns, and advance the columnized objects in individually spaced relationship and successive order into the presence of a sensing device 60 as illustrated in FIG. 2.

The marshalling and advancing assembly illustrated in FIGS. 2, 3, 4 and 5, embraces a series of upwardly inclined and parallel extending columnizing troughs, each composed of a longitudinally extending tumbling roll 45 and an adjacent spinner roll 46 defining a columnizing trough therebetween, and which are rotatably driven from the lower end thereof. A continuous paddle equipped object advancing and marshalling chain 20 driven from the lower end thereof, withdraws objects from the receiving area or bin 40 and advances a column of articles along the adjacent trough while the columnized objects are tumbled during advance by the rotating tumbling roll 45 and adjacent spinner roll 46, thereby serving to marshall the columnized objects in single file and individually spaced order when they reach the upper end of the trough formed by the tumbling roll 45 and adjacent spinner roll 46 for discharge into the inner tube 61 of the sensing ring 62 as shown in FIG. 2.

In the alternate form of marshalling and advancing assembly shown in FIGS. 15–20, the trough forming tumbling roll 125 and adjacent spinner roll 126 in paired arrangement are rotatably driven from the upper end thereof, and a single object advancing chain 20a extends therebetween, driven from the upper end thereof, and equipped with spaced object advancing paddles extending from both sides thereof. Thus a single chain 20a with object advancing paddles extending from both sides thereof, operates to advance two columns of objects along the paired tumbling and spinning rolls positioned on opposite sides of a single object advancing chain. When the respective columns of objects reach the upper end of the trough forming tumbling and spinner rolls 125 and 126, they are columnized in single file and individually spaced in order and can thus be discharged into the inner tube 61 of the sensing device 60 positioned directly adjacent the upper end of each discharging column as indicated in FIG. 15.

In substitution for the sensing device 60 and the mechanically driven deflector unit 70, positioned directly below the upper discharge ends of the trough forming marshalling rolls as indicated in FIGS. 2, 15 and 21, the marshalling apparatus may be made to accommodate an alternative form of sensing and deflector arrangement, as illustrated in FIGS. 27–34. In this alternative arrangement, a sensing unit 100 is compactly contained within a boxlike structure 101 having a non-conductive cover part 101, which forms a linear continuation of the upper half of each tumbling roll 125, as illustrated in FIGS. 29–34.

The sensing unit 100, controls the energization of a clutch and brake device 85, whose driving part oscillates in synchronism with the advancing movement of the columnized and individually spaced objects as they separately arrive in sensing relation to the sensing device 100. When the clutch and brake mechanism 85 is electrically energized by the controlling influence of the sensing device, a deflecting paddle or paddle wheel 140, positioned adjacent the sensing unit 100, is manipulated to separate the objects into two classifications, and thereupon direct the two groups into separate discharge chutes.

As an exemplification of the flexibility in use of the marshalling apparatus of this invention, this marshalling apparatus may be mounted as an integral unit upon a traveling vehicle such as a harvester equipped to excavate root crops from the soil, as exemplified in FIGS. 1 and 2. Such root crop harvesters may be equipped with one or more digging shovels 170, each of which transfers the excavated material onto an upwardly inclined primary conveyor 180, composed of a series of transverse bars as shown in FIG. 15, through which soil and other debris smaller than the root crop to be gathered, may be sifted to ground. Each primary conveyor 180 is positioned between a pair of upwardly inclined frame members 181—181 and associated side wall forming plates 182—182 supported by vertical struts 181 and strut plates 181'' from the bed frame 155' of the harvester as shown in FIGS. 15 and 16. The lower end of the primary conveyor 180 is supported by an idler spool 179 as shown in FIG. 2, whose shaft may be journalled on the side frame members 181—181. The upper end of each primary conveyor 180 is supported by spaced driving sprockets 184 fixed to a shaft 184' journalled on the side frame members 181—181. A drive sprocket 189' fixed to one end of each shaft 184' is driven by a chain 189 trained around a sprocket 188' fixed to the main transverse drive shaft 188 of the harvester, as shown in FIGS. 14A, 15 and 16.

The root crop harvester is also preferably equipped with a primary deviner 1 as shown in FIGS. 2 and 16, positioned directly adjacent the discharge end of each primary conveyor 180. The primary deviner 1 may comprise a free riding deviner roll 2, whose supporting shaft extends parallel to the adjacent drive shaft 184' of the primary conveyor 180, but preferably under and slightly to the rear of the conveyor drive shaft 184', so that the root crop to be gathered as well as vines and other debris, must drop onto the upper surface of the deviner roll 2.

The deviner roll 2 may be in the form of a rubber belt 3 having a friction or gripping surface which travels in the direction of the arrow shown in FIG. 2. A belt tensioning roll 4, extending under and spaced from the lower reach of the primary conveyor 180, supports the lower end of the deviner belt 3. The deviner roll 2 or deviner belt 3 is flexibly supported so that its gripping surface normally makes pressure contact with the lower reach of the elevating conveyor 180 as it moves around the primary conveyor supporting sprockets 184. This support may be provided by a pair of spaced arms 5 as shown in FIGS. 2 and 16, and on which the shaft of the deviner roll 2 and lower belt guiding roll 4, are journalled. The lower ends of the supporting arms 5 are pivotally connected to suitable bracket plates 181'' supported from the harvester body. Resilient means such as springs 6, connecting to the supporting arms 5 and frame member 181 of the harvester, maintain the rubber covered surface of the deviner roll 2 or deviner belt 3 in pressure contact with the lower reach of the primary conveyor 180 as it travels along the under side of the driving spool 184 of the primary conveyor.

The mixture of objects whose individual characteristics are to be sensed and separated, such as a root crop of higher electrical conductivity than stones, hard clods and sod mixed therewith, are discharged from the primary conveyor 180 into a receiving area or bin 40 as illustrated in FIG. 2, and which forms a component part of the unitized marshalling apparatus of this invention.

THE OBJECT MARSHALLING AND ADVANCING ASSEMBLY

The mixture of objects, such as electrically conductive potatoes and non-conductive stones, clods and other debris, as discharged from the primary conveyor 180, are collected in a receiving area or bin 40 of the object marshalling and advancing assembly 10, as generally illustrated in FIG. 2.

In general structure, the object marshalling and advancing assembly 10 extending from the drop bin 40 as shown in FIGS. 3, 4 and 5, includes a series of paddle equipped object advancing and marshalling chains 20, operating in cooperative relation to a series of rolls, including a tumbling roll 45 by means of which the objects are spun or tumbled during upward advance, and an associated spinner roll 46 and floating roll 47.

The object marshalling and advancing assembly 10 also includes a suitable supporting framework which may comprise a pair of upper side frame members 11 and a pair of lower side frame members 11' extending longitudinally at an inclined angle; the upper and lower side frame members 11–11' being joined by transversely extending upper and lower head frame members 12–12' and upper and lower tail frame members 13–13', thereby providing a pair of vertically spaced frames of generally rectangular form which are joined by vertically extending corner struts 14, as shown in FIGS. 3, 4 and 5. The integrated assembly framework is rigidly supported at an angle of about 30° to the horizontal, from the floor of a processing plant or traveling harvester carriage.

The object marshalling and advancing assembly 10 as shown in FIGS. 3, 4 and 5 is equipped with six marshalling chains 20, each having a column of spaced paddles extending laterally therefrom and together providing a series of six paddle columns. However, it will be appreciated that any desired number of marshalling chains and associated object advancing paddles may be used as required. Each column of object advancing paddles moves within a trough defined by a set of triple rolls which includes an object tumbling roll 45, a secondary spinner roll 46, and a cooperating floating roll 47.

The object advancing chains 20 are supported by three longitudinally extending upper tubular frame members 15 whose ends are secured to the upper head frame member 12 and the lower tail frame member 13 respectively, and by a corresponding number of lower tubular frame members 15' whose ends are respectively supported by the lower head frame member 12' and the lower tail frame member 13' as shown in FIGS. 3 and 4, each set of upper and lower tubular frame members 15–15' being in vertical alignment. Each of the upper tubular frame members 15 has a longitudinally extending bar 16 of Z-shaped cross-section secured to each side face thereof as shown in FIG. 4. Each Z bar 16 provides a supporting channel in which the upper reach of an object marshalling chain 20 may travel.

Figure 6:
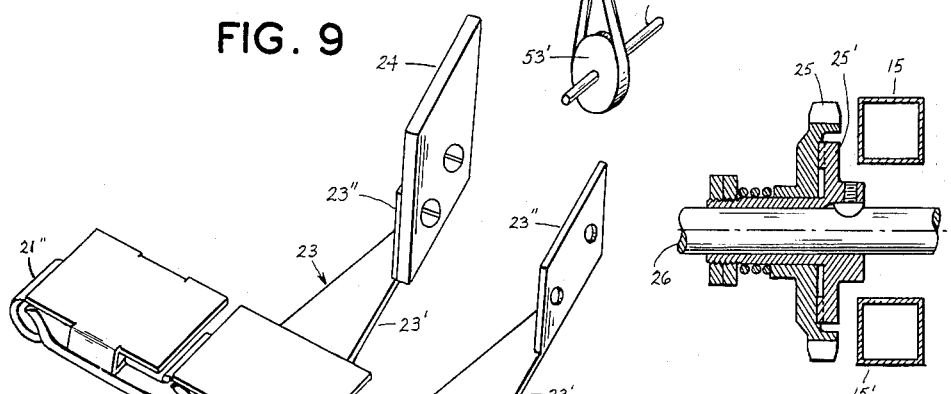
FIG. 6 is an enlarged fragmentary perspective detail of one of the advancing chains and associated advancing paddles which form a part of the object marshalling and advancing assembly illustrated in FIG. 3.

Each of the paddle equipped object advancing chains 20 is assembled from a series of hingedly connected chain links 21 as shown in FIG. 6, which are joined together to provide a continuous chain. Each link 21 may be stamped from a generally rectangular plate of sheet metal to provide a generally rectangular link frame having a transverse leg section 21' at one end thereof, and an underslung curvilinear grip lip 21" formed to encircle the transverse leg 21' of the next adjacent link, the curvilinear grip lip 21" being cut from the plate which forms the link to provide a generally rectangular hole therein. Each link may be provided with a link covering platform 22 formed of sheet metal which presents wing tabs 22' secured to the longitudinal legs of the link frame as by weldments.

A series of object advancing paddles arranged in columnar alignment, are secured in uniformly spaced relation to one side of the adjacent chain links. Each paddle 23 includes a laterally extending arm section 23' secured as by weldments to the adjacent link 21, and a paddle section 23" extending upwardly therefrom and slightly rearwardly inclined with respect to the center line of the link chain as shown in FIG. 6. Each paddle section has secured thereto a paddle plate 24 which may be made from rubber impregnated fabric of substantial thickness and stiffness, but sufficiently flexible to avoid bruising the objects in tumbling contact therewith.

Figure 7:
FIG. 7 is a transverse section of the clutch sprocket associated with the shaft which drives the marshalling chains and paddles and as the same would appear when viewed along line 7—7 of FIG. 5.

The upper reach of each continuous object advancing chain 20 is pocketed in the guide channel formed by a Z bar 16 attached to the adjacent upper tubular frame member 15, with the upper surface of the link covering platforms 22 of the chain lying in substantially the same horizontal plane as the upper surface of the adjacent tubular frame member 15, as shown in FIG. 4. The lower end of each object advancing chain 20 is trained over a tail sprocket 25 connected to a slip clutch 25' as shown in FIGS. 3 and 7, which is connected to a transverse supporting shaft 26 as shown in FIGS. 3, 5 and 7. The transverse shaft 26 on which all of the tail sprockets 25 and associated slip clutches 25' are connected, is supported at the ends thereof by bearing blocks 27 secured to the adjacent upper and lower side frame members 11–11' of the object marshalling and assembling framework, as shown in FIGS. 3, 4 and 5. A driving sprocket 28, as shown in FIG. 14A, is secured to the projecting end of the tail sprocket supporting shaft 26. A driving chain 29, is trained around the driving sprocket 28 and is in turn trained around a sprocket 29' fixed to the main transverse drive shaft 188 of the harvester as shown in FIG. 14A.

Figure 10:
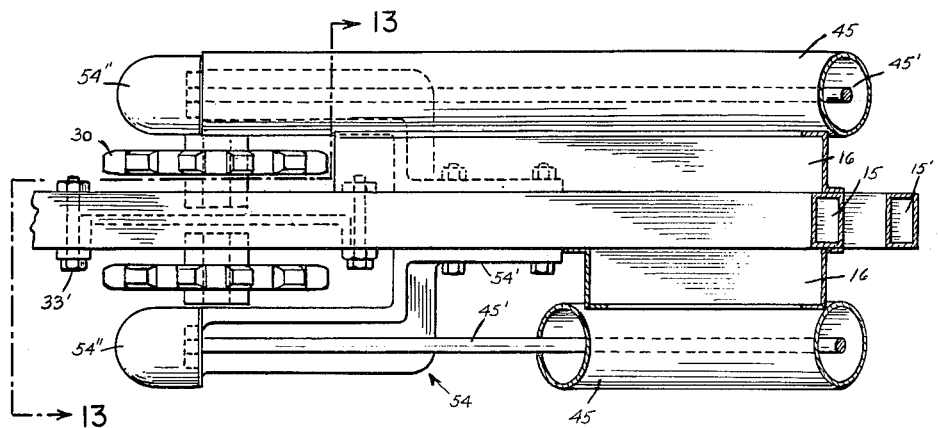
FIG. 10 is a fragmentary plan view showing a part of a pair of marshalling rolls and supporting framework, the paired sprockets for the marshalling chains and the roll supporting brackets.
Figure 11:
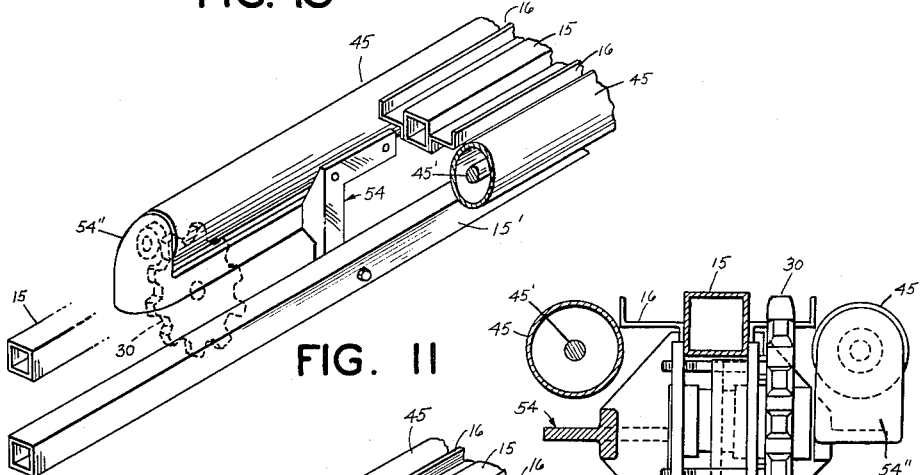
FIG. 11 is a fragmentary perspective view showing a part of a pair of marshalling rolls, and adjacent marshalling chain supporting channels therebetween also one of the marshalling roll supporting brackets, and also one of the marshalling chain supporting sprockets in phantom lines.
Figure 13:
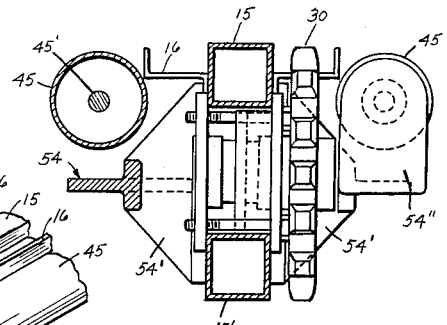
FIG. 13 is a transverse view, partly in section, of one pair of lower marshalling rolls and supporting brackets and framework as the same would appear when viewed along line 13—13 of FIG. 10.
Figure 12:
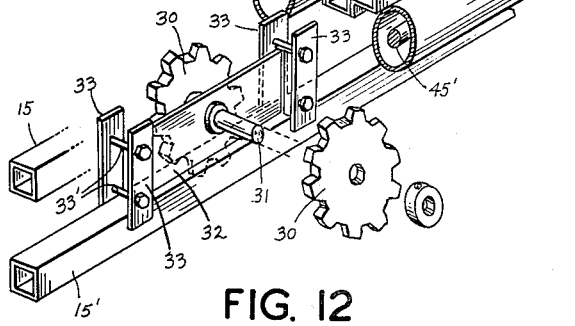
FIG. 12 is a further fragmentary perspective view showing the lower part of marshalling rolls and marshalling chain supporting channels; this view also showing the marshalling chain supporting sprockets and connecting stationary shaft, and also the stationary shaft supporting bracket which may be adjusted to maintain the marshalling chains at proper tautness.

The upper discharge ends of the object advancing and marshalling chains 20 are each supported by an idler sprocket 30, as shown in FIGS. 5, 10, 11, 12 and 13. The six idler sprockets 30 for the assembly shown in FIG. 3 are arranged in pairs, and positioned on opposite sides of the upper and lower tubular frame members 15–15' positioned therebetween, with the two sprockets 30 in alignment with the respective channel formations of the chain supporting Z bars 16. Each pair of adjacent idler sprockets 30 are journaled on a short shaft 31 as shown in FIG. 12. The short shaft 31 extends through and is rigidly fixed to a vertical metal plate 32 of substantial stiffness which rests upon the adjacent lower tubular frame member 15'. The vertical metal plate 32 is supported by two pairs of clamp plates 33 secured as by clamp bolts 33' to each end thereof, with the upper and lower ends of the paired clamp plates 33 positioned to frictionally grip the opposite sides of the upper and lower tubular frame members 15–15' extending therebetween. By adjusting the position of the paired sprocket supporting plates 33 and fixedly securing the same to the upper and lower tubular frame members 15–15' as by tightening the clamp bolts 33', the object advancing chains 20 may be drawn to proper tautness.

The object mixture dropping from the primary conveyor 180 cascades into the drop bin 40 therebelow, which forms a part of the object marshalling and advancing assembly 10, as shown more particularly in FIGS. 3, 4 and 5. The drop bin 40 comprises a pair of side wall plates 41 secured to the adjacent upper frame members 11 of the assembly, and a transverse rear wall plate 42 suitably secured to the lower ends of the side wall plate 41 of the bin. The transverse rear wall plate 42 presents paddle entry cut-outs 42' as shown in FIG. 4 through which the object advancing paddles 23 may travel when they have passed over the upper half of the tail sprockets 25 which support the lower end of the advancing chains 20.

The entry side of the paddle entry cut-outs 42' in the transverse wall plate 42 may be provided with a vestibule housing 42" formed of sheet metal as shown in FIG. 5, to prevent wedging of potatoes between the entry cut-outs 42' and the paddles 23. A downwardly inclined deflection plate 43, extending over the tail sprockets 25 and associated slip clutches 25', and secured to the upper end of the rear wall plate 42 and adjacent upper tail frame member 13', provides protection for the chain supporting and driving mechanism therebelow.

The floor of the drop bin 40 may be formed of a series of sheet metal floor plates 44, each extending between and secured to the right and left hand Z bars 16 of adjacent advancing chains 20 as shown in FIGS. 3 and 4. The channel formations of the Z bars 16 and the upper face of the tubular frame member 15 extending therebetween are not covered by these floor plates 44. Each floor plate 44, comprising a pair of relatively flat floor sections 44' and an intermediate upwardly arching section 44", extends between the rear wall plate 42 of the bin 40 and the adjacent lower ends of the adjacent tumbling rolls 45 and spinner rolls 46. The upper ends of the arched sections 44" of these four plates are shaped to slightly overlap the lower ends of the two spinner rolls 46 as shown in FIG. 4.

To facilitate sorting of the objects into two or more classes, the unclassified objects are marshalled into single file columns and in spaced order as they are separately advanced by the marshalling chains 20 and associated paddle plates 24, operating in cooperation with the tumbling rolls 45 and spinner rolls 46, which extend from the upper ends of the floor plates 44 of the drop bin 40 to a position directly above the selector units 60.

Each column of object advancing paddle plates 24, passing through the drop bin 40, picks up the objects to be classified and pushes the same into the lower ends of the troughs as defined between each tumbling roll 45 and the adjacent spinner roll 46, the rolls 45–46 being upwardly inclined at an angle of approximately thirty degrees. As shown in FIGS. 3 and 4, a tumbling roll 45 is positioned directly beneath each column of paddle plates 24, and a spinner roll 46 is positioned adjacent the outer edge of each column of pattle plates 24 at a slightly higher elevation than the tumbling roll 45 shown in FIG. 4. Each tumbling roll 45 and the adjacent spinner roll 46 are separated and thus define a trough in which the objects may travel as pushed towards the rear end of the marshalling framework by the aligned paddle plates 24. The objects advanced by the paddle plates 24 and contained in the troughs as confined between each tumbling roll 45 and adjacent spinner roll 46 are tumbled during advance by the rolls 45 and 46 which are driven in the direction indicated by the arrows shown in FIG. 4.

While two or more objects may be pushed by each paddle plate 24 from the drop bin 40, the upwardly inclined movement of each paddle plate 24, together with the rotation of the adjacent tumbling rolls 45 and 46 on which the objects are supported, results in the elimination of objects which are not directly engaged by the paddle plates 24. Two non-spherical objects tumbling in contact with each other will result in the ejection of all but one object from the advancing influence of a single paddle. Retention of a single object in contact with each of the columnized paddle plates 24 is facilitated by making the pushing faces of the columnized paddle plates 24, as shown in FIG. 3, rearwardly inclined at a slight angle from lines perpendicular to the center line of travel of the upper reach of the marshalling chain 20.

The objects not directly engaged by the columnized paddle plates 24 during upward inclined travel thereof, spill laterally onto the link covering platforms 22 of the marshalling chains 20, or onto the substantially coplanar upper surface of the adjacent upper tubular frame member 15, and then tumble by gravity back towards the drop bin 40, until again engaged by a paddle plate 24. As thus operated, a single object is carried by each paddle plate 24 for separate discharge into the adjacent drop tube 61 of the selector unit 60.

Each of the paired tumbling rolls 45 and 46 preferably has a roughened peripheral surface of soft rubber to thereby effectively spin or tumble the objects in contact therewith. The lower ends of the arched sections 44" of the floor plates 44 provide walls which channel the objects into the troughs defined between adjacent tumbling rolls 45–46, and each roll 46 and superimposed floating roll 47 also serves to channel the objects into these troughs, and prevent their escape between adjacent floating rolls 47.

Figure 9:
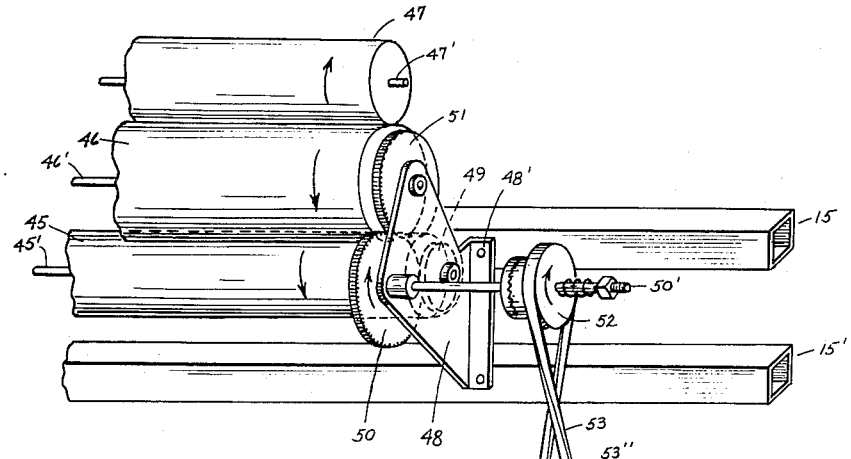
FIG. 9 is a fragmentary perspective view of one set of potato marshalling and secondary deviner rolls which are driven from the intermediate transverse shaft shown in FIGS. 9, 14 and 14A.

Each tumbling roll 45 as shown in FIGS. 3, 4, and 9–13, is supported on a shaft 45' and each companion roll 46 is also supported on a shaft 46' as shown in FIGS. 3, 4 and 9. Positioned above each companion roll 46 and normally in floating contact therewith is a floating roll 47 which is also supported on a shaft 47'. Each floating roll 47 has riding contact with the adjacent companion roll 46, is rotated thereby in the direction indicated by the arrows in FIG. 4 cooperates therewith to engage and withdraw therebetween any vines, vine fragments or sod not theretofore removed by the primary deviners 1.

As shown in FIGS. 3, 4, and 9, the lower end of each tumbling roll shaft 45' and companion roll shaft 46' is supported by a plate bracket 48 having an attaching flange 48' which is secured as by bolts to the adjacent upper and lower tubular frame members 15—15'. The tumbling roll shaft 45' carries a gear 49 which meshes with a driving gear 50 fixed to an extension 50' of shaft 45' and rotatably journaled on the bracket plate 48 as shown in FIG. 9. The driving gear 50 also meshes with a gear 51 fixed to the companion roll shaft 46. The gears 49–50–51 are so ratioed that the tumbling roll 45 and companion roll 46 are driven at the same peripheral speed. The gears 49–50–51 may be contained within a suitable gear housing 48" which is fixed to and supported by the plate bracket 48 as indicated in FIG. 4.

The driving gear shaft extension 50' is driven by means of a slip clutch pulley 52, attached thereto, and which supports a drive belt 53 trained around a drive pulley 53' fixed to the transverse drive shaft 53" as shown in FIGS. 9, 14 and 14A. Since the rolls defining adjacent marshalling troughs are positioned on opposite sides of the tubular frame members 15—15', and rotate in opposite directions, adjacent drive mechanisms of the type shown in FIG. 9 should be designed for opposite rotation. Reversal of rotation may be obtained by twisting alternate V belts 53 in opposite directions, as shown in FIG. 14. Guide pulleys such as 52' may be employed to aid in directing belts 53 from pulleys 53' to pulleys 52, and to guide belts 53 around obstructions.

The upper end of each tumbling roll shaft 45' is supported by a bracket 54 terminating in a pair of leg portions 54' which are secured as by bolts to the adjacent upper and lower tubular frame members 15—15'. Each bracket 54 terminates in a rounded section 54" which may be shaped in a hemispherical form as shown in FIGS. 10 and 11, and which provides a cover for the upper end of the tumbling roll 45 so that the objects may slide smoothly thereover and into the drop tube 61 of the adjacent selector unit 60. Each rounded end section 54" has an inner wall which rotatably supports the upper end of the tumbling roll shaft 45'.

The lower and upper ends of each floating roll shaft 47' are supported by an overhead structure, as shown in FIGS. 3, 4 and 5, which includes a pair of lower vertical struts 55 and a pair of upper vertical struts 55' fixed to the upper and lower side frame members 11—11' of the marshalling framework as previously described. Each pair of vertical struts 55—55' are joined by a transverse bar 56—56', as shown in FIGS. 4 and 5. Each end of the floating roll shaft 47 is pivotally suspended by means of an angular leg 57 whose upper end is pivotally connected and suspended from the adjacent transverse bars 56—56', the lower ends of each angular leg 57 providing journaled support for the adjacent projecting end of the floating roll shaft 47'. Each floating roll 47 rests by gravity weight on its associated spinner roll 46 therebelow, and is separated from the spinner roll only when a vine or sod is gripped therebetween. The upper end of each spinner roll shaft 46' is fixedly suspended from the upper cross bar 56' by means of a downward suspended strut 58 fixed thereto, the lower end of the suspension strut 58 providing journalling support for the upper end of the spinner roll shaft 46'.

In operation, the rearwardly inclined and vertically extending paddle plates 24 serve to push the objects from the floor 44 of the drop bin 40 into the troughs defined between each adjacent pair of rotating tumbling and spinner rolls 45—46. As the objects are pushed into these troughs by the columnized pusher paddle plates 24, individual objects not in direct contact with a paddle plate 24 are pushed laterally onto the cover platforms 22 of the marshalling chains and roll back towards the bin 40 by gravity, until again picked up by the paddle plates 24. During upwardly inclined travel of the marshalled or columnized objects as advanced by the individualized and columnized paddle plates 24, each object is given a tumbling action which serves to remove undesired material clinging thereto. Any remaining vines or sod are caught during tumbling between the adjacent spinner roll 46 and floating roll 47 and dropped to ground. As the objects, each separately advanced by a paddle plate 24, reach the upper end of the tumbling rolls 45, they are separately dropped without obstruction, and one by one in rapid sequence, into the drop tubes 61 of the adjacent selector units 60. In root crop harvesting, soil build-up or wrapping of vines on the rolls 45 and 46 is prevented by the fact that the longitudinal movement of the paddles 24 adjacent the rotating rolls 45, 46 and 47 produces a spiral wiping action which serves to remove any accumulations from the rolls.

The marshalled and columnized objects are each separately pushed by an individual paddle plate 24 into a position for selective classification into two or more groups in accordance to size, shape, composition, or magnetic or electrical characteristics of the object to be classified. For example, where a root crop or objects which conduct electricity are to be separated from objects such as stones, clods or sod of substantially lower conductivity, an electronic selector and classifier unit 60 may be used as indicated in FIG. 2. The unit 60 may comprise a doughnut shaped sensing or oscillator ring 62 whose tubular inner wall 61 is positioned in alignment with and adjacent the object discharging end of each paddle column, as indicated in FIGS. 15 and 21. The sensing ring 62 as shown in FIG. 2 is formed by a casing 62' of U-shaped cross-section which surrounds and is sealed to the inner drop tube 61. The U-shaped casing 62' is packed with insulating material such as foam plastic in which a sensing or oscillator coil L1 is protectively imbedded. The U-shaped casing 62' may be formed of metal, while the inner drop tube 61 of the oscillator ring 62 is formed of a pastic material having low dielectric loss. The sensing or oscillator coil L1 presents two end terminals and a center tap terminal which emerge from the oscillator casing 62, and which extend into an electronic control housing 63, as shown in FIG. 2, bolted to the sensing coil casing 62'. The control housing 63 has a power cable connection 63' containing a number of conductor wires which supply current to a series of interconnected electronic circuits contained therein. The electronic circuits contained within the control housing 63 may comprise a sensing oscillator or detector circuit to which the sensing coil L1 is connected, an amplifying circuit for substantially amplifying the pulse from the detector circuit, and a switching circuit which controls the operation of the magnetic clutch and brake mechanism 70 whose housing 64 is secured to the electronic control housing 63.

The housing 64 which contains the magnetic clutch and brake mechanism 70, is provided with a journal which supports a stub shaft 65' to which a deflector or kicker plate 65 is secured as indicated in FIG. 2. Each kicker plate 65 may be normally held at an inclined angle directly under the tubular inner wall 61 of the sensing ring 62, and in this position operates to laterally deflect any object as dropped through this ring. However, the sensing coil L1 as contained within the sensing 62 is influenced by the electrical conductivity of the object dropping through the ring, and when an object having relatively insignificant electrical conductivity is dropped through the sensing ring 60, the kicker plate 65 is not activated but remains in the inclined position as shown in FIG. 2. However, when an object of substantially higher electrical conductivity drops through the sensing coil L1 contained in the sensing ring 62, the sensing coil L1 promulgates an electrical impulse through the circuits contained therein, which in turn applies instantaneous coupling force to the clutch and brake mechanism 70, which then operates to manipulate the stub shaft 65' of the kicker plate 65 to swing the kicker plate 65 into a vertical position as shown in phantom lines in FIG. 2, so that the conductive object dropping through the sensing coil containing ring 60 may drop downwardly past the kicker plate without deflection, for discharge onto a transverse discharge conveyor 190 as shown in FIG. 2.

Figure 8:
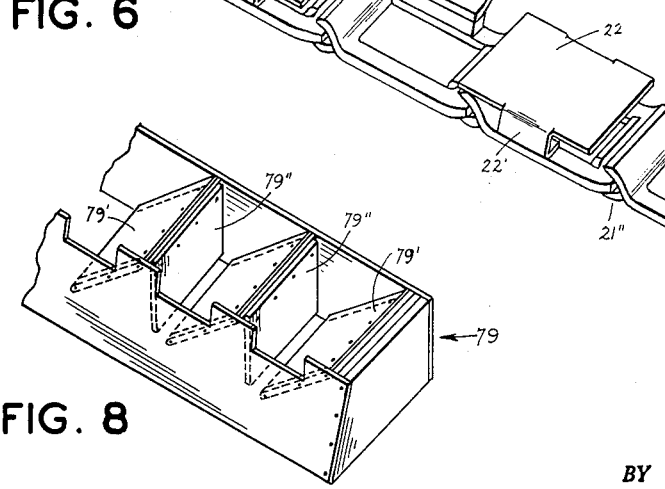
FIG. 8 is a fragmentary perspective detail of the cushioning box which cushions the fall of the potatoes as dropped from the potato selector units generally shown in FIG. 2.

In the case of conductive objects which are subject to bruising, such as potatoes, a cushioning box 79 may be provided for cushioning the fall of the conductive objects dropping through the sensing rings 62. The cushioning box 79, constructed as shown in FIG. 8, is positioned directly above the discharge conveyor 190, and may be equipped with a series of inclined rebound baffles 79' made of loosely stretched gum rubber or like cushioning material and positioned directly under the respective sensing rings 62 as indicated in FIG. 2.

Each magnetic clutch and brake assembly 70 includes a rotor having a horizontal shaft 66 and drive pulley 66' affixed thereto, and which is continuously driven as by a V belt 67 trained around a drive pulley 67' fixed to a primary transverse shaft 68 which drives all the magnetic rotor shafts 66 in synchronism, as illustrated in FIG. 14. The transverse shaft 68 has a main drive pulley 68' fixed thereto which drives a V belt 69 trained around a drive pulley 69' fixed to a secondary transverse shaft 53" as shown in FIGS. 14 and 14a. It will be noted that the secondary transverse shaft 53" is equipped with spaced pulleys 53', whose driving belts 53 are trained around pulleys 52 which rotate the tumbling and spinner rolls 45 and 46 as shown in FIGS. 9 and 14.

The clutch and brake assembly 70 essentially comprises a continuously driven rotor fixed to its shaft 66, a magnetic clutch which has a driving connection to the object deflector shaft 65', and a magnetic brake which operates to brake the clutch, and all contained within the housing 64. The circuits in the control box 63 are so systematized, that when an electrically conductive object drops through the sensing ring 62, the clutch is instantly interlocked to the continuously driven rotor, and the clutch operated deflector 65 is swung into vertical position to permit the conductive object to drop onto the discharge conveyor 190. The deflector 65 is then automatically returned to inclined position and so held by the magnetic brake, when a non-conducting object passes through the sensing ring 62 and thereby deflected away from the discharge conveyor 190.

As previously explained, a third transverse shaft 26 supports the drive sprockets 25 of the paddle advancing chains 20. The third transverse shaft 26 is provided with a drive sprocket 28 whose drive chain 29 is trained around the driving sprocket 29' of main transverse drive shaft 188, as shown in FIGS. 14 and 14a. The drive belt 53''' which drives the secondary shaft 53" is also trained around a pulley of the main transverse drive shaft 188 as shown in FIG. 14a. Thus, a series of integrated drives are provided, all driven from a main transverse drive shaft 188 and so that the rotor shafts 66 of the deflector operating clutch and brake mechanisms 70 are rotated in synchronism with the advance movement of the paddle equipped object advancing chains 20.

As shown in FIGS. 14 and 14A, the transverse drive shaft 188, which drives the clutch and brake rotors in synchronism with the paddle chain advancing sprockets 25 as previously described, may also drive the shafts 184' of the primary conveyors 180 through sprockets 189'–188' and drive chain 189. Also, as shown in FIGS. 2 and 14A, the transverse shaft 188 may be driven by gearing 187 from a longitudinal shaft 195 which drives the shaft 191' of the discharge belt 190 through drive chain 193, sprocket 194, transfer shaft 195, drive chain 196, transfer shaft 197 and drive chain 198.

SUPPLEMENTAL SYSTEM FOR CLASSIFYING AND REMOVING OBJECTS OF EXCESSIVE SIZE

As heretofore explained, the marshalling apparatus of this invention may have a primary sifting conveyor 180 associated therewith adapted to sift out and remove objects, materials and debris of such small size that the same cannot be effectively columnized in spaced order by the installed marshalling apparatus, or which should be eliminated before the marshalling operation begins. Likewise, the material to be processed may contain objects or debris of such large size or form that the same cannot be effectively columnized in individually spaced order by the marshalling apparatus, or for some other reason should be eliminated before marshalling begins.

For example, in processing or harvesting a root crop such as a potato field infested with a substantial quantity of semi-green vines and weeds, stones and sods of substantial size, it is desirable to remove such debris not eliminated by the primary sifting conveyors 180 and primary deviners 1, at an early stage in the systems flow. The larger stones and sods which have not dropped through the primary sifting conveyors 180, and the vine and weed growth not removed by the primary deviners 1, can be effectively eliminated by the provision of a pair of right and left hand secondary sifting conveyors 115 as shown in FIGS. 15, 16, 17, 21 and 22. The upper runs of the secondary sifting conveyors 115 may be positioned directly under the deviner rolls 2 of the respective primary deviners 1, with the upper runs extending transversely from the center line of the processing system in a lateral direction for side discharge of the large sods, stones, weeds and vines.

Each of the secondary sifting conveyors 115, may be formed by a pair of continuous link chains 115' joined by a series of cross rods 115" which are so spaced that all of the desired objects or potatoes as discharged from the primary deviner 1 will drop therethrough, with retention thereon of the larger stones, sods, weeds and vines not previously eliminated. The upper run of the right and left hand conveyors 115 extend laterally from the center line of the processing system in a horizontal plane so that all of the material discharged from each primary deviner 1 will drop on to the cross rods 115″ of the upper run of the conveyor 115, with the desired objects or potatoes dropping through the upper run of the conveyor 115 and into a drop bin 40a positioned between the upper and lower runs thereof. The secondary sifting conveyors 115 advantageously serve to further classify the material flow by removing the larger size objects so that only intermediate size objects not previously removed would drop into the drop bins 40a.

Both right and left hand secondary sifting conveyors 115 are supported from the lower end of the inclined marshalling framework heretofore described and also shown in FIGS. 15 and 16. As heretofore explained, this framework comprises a pair of upper and lower side frame members 11—11′ whose ends are joined by upper and lower head frame members 12—12′ and upper and lower tail frame members 13—13′, thereby providing upper and lower rectangular frames joined by vertically connecting struts 14.

The upper run of each of the secondary sifting conveyors 115 is supported by a pair of upper side sprockets 116 which engage the conveyor chains 115′, the paired side sprockets 116 being fixed to a sprocket shaft 116′ whose ends are journaled in a pair of support brackets 116″ fixed to the vertical struts 119′ as shown in FIGS. 16 and 17. The inner end of the upper run of each of the debris removing conveyors 115 is also supported by a pair of inner guide sprockets 117 over which the paired conveyor chains 115′ are trained, the paired guide sprockets 117 being fixed to a longitudinal shaft 117′. The ends of the longitudinal shaft 117′ are journaled on a pair of spaced plate brackets 118—118′. The plate bracket 118 is fixed to the upper frame member 13 of the framework and extends over the inclined plate 43, and the plate bracket 118′ is suspended from a transversely extending bar plate 119 whose ends are fixed to vertical struts 119′ attached to the adjacent side frame members 11 and 11′.

The paired conveyor chains 115′ of the lower reach of each secondary sifting conveyor 115 is trained over a pair of side driving sprockets 120 fixed to a longitudinal shaft 120′, and over a pair of inner chain engaging guide sprockets 121 also fixed to a longitudinal shaft 121′. The longitudinal shafts 120′–121′ of each conveyor 115 are supported by an underslung framework comprising a pair of transverse bars 122 whose ends are fixed to vertical struts 119′ attached to the side frame members 11 and 11′ of the marshalling framework as shown in FIG. 17. The ends of the longitudinal shafts 120′–121′, to which the lower sprockets 120–121 are attached, are journaled in suitable journals fixed to the transverse bars 122.

Each of the driven shafts 120′ which supports the driving sprockets 120 of the right and left hand secondary sifting conveyors 115, has a driving pulley 124 fixed to the end thereof which carries a V-belt 124′ trained over a driving pulley 124″ which is fixed to and driven by the longitudinal drive shaft 195 shown in FIG. 26. Since the two secondary sifting conveyors 115 move in opposite directions, one of the V belts 124′ is crossed to reverse the direction of rotation of its respective pulley 124, as shown in FIG. 26.

Under some conditions, vines, weeds, etc., have a tendency to wrap around the deviner belt 3, or around the deviner roll 2 if the deviner belt 3 is omitted. Soil accumulations may also build up on the deviner surface. A very simple and effective means of preventing vine or weed wrap-up and soil accumulation is obtained by attaching one or more projecting prongs or hooks 115a to the continuous link chain 115′, adjacent the deviner belt 3 or roll 2 as indicated in FIGS. 15, 16, 17, 21 and 22.

As vines or weeds wrap up, or soil accumulates on the deviner surface, they will be torn or scraped off by the adjacent projections 115a moving transversely in close proximity to the deviner surface. Alternatively, the projections 115a may be omitted, and the chain 115′ mounted so as to travel in close proximity to the deviner surface, so as to remove excess vines, weeds and soil from the deviner surface.

ALTERNATIVE ADVANCING AND MARSHALLING ASSEMBLIES

Within the purview of this invention, various modifications can be made to the object advancing and marshalling structure illustrated in FIGS. 3, 4 and 5 and previously described. For example, it is possible to advance a greater number of columnar rows of objects to be classified through the advancing and marshalling assembly by providing each advancing chain with two columnized series of advancing paddles extending from opposite sides of each advancing chain.

There is illustrated in FIGS. 15–25 various alternative forms of object advancing and marshalling assemblies whose drives are provided at the rear end thereof, and which are particularly adapted for association with either one or a pair of transverse secondary sifting conveyors 115 having a drop bin 40a therebelow. In the modification shown in FIGS. 15–20, a series of four paddle equipped advancing and marshalling chains 20a are provided, each of which may be formed by a hingedly connected series of stamped metal chain links 21 similar to the links 21 shown in FIG. 6 and previously described.

Each of the paddle equipped advancing chains 20a is supported by a lower idler sprocket 34 as shown in FIGS. 16, 18 and 19; all sprockets 34 being mounted to freely rotate on a common transverse shaft 34′ whose ends are attached to support plates 34″ which may be fixed to the lower ends of the adjacent upper and lower side frame members 11–11′ of the assembly framework previously described. The upper ends of each advancing and marshalling chain 20a are supported by a driving sprocket 35; all of the driving sprockets 35 being fixed by means of a slip clutch 25′, as shown in FIG. 7, to a common sprocket shaft 35′ supported by suitable bearing plates 35″ fixed to the upper ends of the adjacent side frame members 11–11′ of the assembly framework as indicated in FIGS. 15, 16 and 21. The driving shaft 35′ for the paddle equipped advancing and marshalling chains 20a is provided with a driving sprocket 36 fixed to one end thereof as shown in FIGS. 15 and 21, which supports a drive chain 36′ trained around a driving sprocket 36″ which is fixed to the transverse shaft 188 of the marshalling assembly as shown in FIG. 26.

Each of the advancing chains 20a is equipped with a series of longitudinally spaced object advancing paddles 23a extending from each side thereof as shown in FIGS. 15, 17, 18 and 19. Each paddle 23a presents a laterally extending arm section 23a′ which may be welded to or otherwise secured to an adjacent chain link 21 of the advancing chain 20a and terminates in an upwardly extending paddle section 23a″ which may be formed integral with the arm section 23a′, and which carries a relatively soft facing section 24 made from rubber impregnated fabric or the like. Each facing section 24 is so mounted as to incline rearwardly with respect to a line which is perpendicular to the longitudinal axis of the paddle supporting chain 20a as shown in FIG. 19. It is thus evident that each advancing chain 20a, equipped with a series of spaced advancing paddles 23a extending laterally from each side thereof, is operative to advance two columnar rows of objects in an upwardly inclined direction. Each columnar row of objects may be supported during tumbling and spinning advance by a tumbling roll 125 or 125a, and/or a spinner roll 126 or 126a as hereafter more fully described.

To support the upper run of the respective advancing chains 20a, a longitudinally extending T-shaped supporting bar 17 is provided, whose flat section 17' is positioned directly under the upper run of its associated advancing chain 20a so as to provide a supporting slide surface therefor. The lower end of the support bar 17 is secured to a transverse angle shaped supporting member 17" as shown in FIG. 19 which extends through the lower loop portion of all of the advancing chains 20a, and whose ends are suitably secured to the side frame members 11-11' of the framework assembly. The upper end of each T-shaped bar 17 is supported by pedestal bracket 18 as shown in FIG. 19 which seats upon a transverse angle member 18' which extends through the upper loop portion of all of the advancing chains 20a and whose ends are suitably secured to the upper ends of the adjacent side frame member 11-11' of the framework assembly as shown in FIG. 16.

It is desirable to maintain the upper run of each advancing chain 20a in smooth sliding contact with the face section 17' of the T-bar 17 therebelow. As shown in FIGS. 17, 18 and 20, each chain link 21 may be provided with a U-shaped guide clip 25a on each side thereof and which respectively telescope over the free side edges of the flat section 17' of the T-bar 17 and maintain sliding contact therewith. These paired guide clips 25a prevent lateral slipping of the upper run of the chain 20a, or tipping of the chain 20a, due to stresses imposed thereon by unbalanced loading of the advancing paddle plates 24.

The upper face of the upper run of each of the advancing chains 20a is covered by the flat section 19' of an upper T-shaped member 19 whose lower end may be secured to the back wall plate 42a of the adjacent drop bin 40a as shown in FIG. 18. The upwardly extending leg 19" of the upper T-shaped member 19 provides a dividing partition which laterally channels the objects into advancing engagement with the paired paddles 23a on each side of the advancing chain 20a. It will be noted that the lower end of the upwardly extending leg 19" terminates short of the drop bin 40a as indicated in FIG. 19. The upper end of each of the T-shaped members 19 is fixed to a transverse bearing plate 37 at the rear end of the harvester as shown in FIGS. 15 and 19, with the bearing plate 37 fixed to the upper and lower head frame members 12-12' as shown in FIG. 16.

The drop bin 40a is positioned directly below the upper run of each of the secondary sifting conveyors 115, and above the upper runs of the advancing chains 20a as shown in FIGS. 15, 16 and 18. Each drop bin 40a presents a pair of side wall plates 41a positioned within but directly adjacent to the vertical runs of the secondary sifting conveyors 115. Each pair of side wall plates 41a is joined to an inclined back wall plate 42a as shown in FIGS. 16 and 18. Each drop bin 40a is provided with a floor which is composed of a series of floor sections as shown in FIG. 18, each section comprising an arched floor portion 44a' extending between the line of travel of an adjacent pair of paddle plates 24, and presenting a pair of laterally extending flat floor portions 44b which terminate in a pair of downwardly extending flange portions 44c. The downwardly extending flange portions 44c are secured as by means of securing bolts 44d and associated spacing collars 44e to the vertical leg of the adjacent T-bar 17, as shown in FIG. 18.

It will be noted that the flat section 19' of each upper T-shaped member 19 also provides a stationary floor portion within the drop bin 40a and directly over the lower end of the lower T-bar 17, and these floor portions in combination with the arched portions 44a and horizontally extending floor portions 44b above described provide a complete floor for each drop bin 40a. The back wall plate 42a of the drop bin 40a is provided with suitable paddle entry cut-outs 42b through which the paddle sections 24 may advance as shown in FIG. 18. As shown in FIG. 16, an inclined baffle plate 43 fixed to the upper transverse frame member 13 of the assembly framework and to the upper end of the back wall plate 42a of the drop bin 40a, provides a protective housing for the lower idler sprockets 34 of the advancing chains 20a and serves to cascade the vines and other debris as discharged from the primary deviners 1 to ground.

In the modification shown in FIGS. 15 to 25, it will be noted that four advancing chains 20a are provided, each equipped with a pair of horizontally extending aligned rows of advancing paddles 23a as shown in FIG. 20, or paired rows of laterally extending and downwardly bent paddles 23b as shown in FIGS. 23, 24 and 25. The eight rows of advancing paddles 23a or 23b, associated with the object advancing and marshalling assemblies shown in FIGS. 15 and 21, serve to classify the objects in to eight advancing columns. The classification of the objects into eight advancing columns as shown in FIGS. 15 and 21, is achieved without enlargement of the marshalling framework by providing each of the four advancing chains 20a with a pair of advancing paddles 23a or 23b extending laterally from the opposite sides thereof.

Object supporting and tumbling means are provided for each row of advancing paddles 23a which extend from the discharge edge of the floor of the drop bin 40a to the upper end of the marshalling framework, and which serve to support and tumble the objects during their upward inclined advance by the adjacent row of advancing paddles 23a. In the form of the invention illustrated in FIGS. 15, 17, 19 and 20, the supporting and tumbling means comprises a rubber covered tumbling roll 125 which is positioned directly under the spaced arm sections 23a' of each row of advancing paddles 23a. When objects such as a mixture of potatoes and stones are to be processed, each tumbling roll 125 may be approximately two and one-half to three and one-half inches in diameter, with a preferred diameter of approximately three inches, with the lower end thereof extending slightly under the adjacent flat floor portion 44b of the drop bin floor as indicated in FIGS. 18 and 19.

Each tumbling roll 125 is fixed to a longitudinally extending supporting shaft 125' whose lower end is journaled in a bearing plate 38 extending transversely of the assembly framework, with the ends thereof secured to the lower ends of the upper and lower side frame members 11-11' thereof. The upper end of each tumbling roll shaft 125' is journaled in the vertical leg of an angular supporting bracket 127 whose horizontal leg may be secured to the transverse angle member 18', which also supports the upper end of the T-shaped bar 17 extending under the upper run of the advancing chain 20a, as previously described and as shown in FIG. 19. The angular shaft supporting bracket 127 presents a hemispherical or dome-shaped section 127' fixed thereto which provides an end cover for the tubular roll 125, and terminates directly adjacent the upper end of the inner drop tube 61 of the sensing ring 62, as shown in FIG. 15.

In the modifications shown in FIGS. 15, 17, 19 and 20, a spinner roll 126 is positioned adjacent to and in operative association with each tumbling roll 125. The spinner roll 126 in this modification is preferably covered with rubber or like gripping material, is positioned at a slightly higher elevation than its associated tumbling roll 125. When a mixture of potatoes and stones are to be processed, the spinner roll may have a diameter in the order of three to four inches, with a preferred diameter of approximately three and one-half inches, and each spinner roll 126 may be spaced from its associated tumbling roll 125 for a distance of approximately one-half to one inch, and are both rotated in the same direction, with the upper peripheries thereof rotating in a direction away from the adjacent paddle supporting advancing chain 20a as indicated in FIG. 19.

Each spinning roll 126 is fixed to a longitudinally extending supporting shaft 126' whose lower end is rotatably journaled in the lower bearing plate 38. The terminal end of the adjacent arched floor portion 44a of the drop bin 40a, slightly overlaps the lower end of the adjacent spinning roll 126, as indicated in FIG. 19. The upper end of each spinning roll 126 terminates in a rounded end section 128, through which the shaft 126' extends, and is rotatably supported by a suitable bearing mounted on the upper transverse bearing plate 37, to which the upper end of the upper T-shaped guide member 19 is also fixed as previously described.

Means are provided for positively rotating each of the spinner rolls 126 and adjacent cooperating tumbling rolls 125, so that they are all rotated in unison in the direction indicated in FIG. 19, and at substantially the same peripheral speed. This driving means may comprise a sprocket 129 which is fixed to the upper terminal end of each spinner roll shaft 126' as shown in FIGS. 15 and 19. One run of a continuous drive chain 129' is looped around all of the eight driving sprockets 129 in the manner indicated in FIGS. 19 and 26 to thereby drive the spinner roll shafts 126' in the directions indicated. The continuous sprocket chain 129' is looped around an end driving sprocket 130 whose stub shaft 130' is rotatably journaled in an end extension of the upper bearing plate 37 as shown in FIG. 15. The other end of the stub shaft 130' is connected to a bevel gear assembly 131 as shown in FIGS. 15 and 26, which is driven by the upper sprocket shaft 35' to which the upper drive sprockets 35 which support the advancing chains 20a are secured, as previously described. The continuous sprocket chain 129' and its associated sprockets are enclosed in a shield 37', shown partly cut away in FIG. 15.

The lower end of each spinner roll shaft 126' has a driving gear 132 fixed thereto, as shown in FIG. 19, which meshes with an idler gear 133 whose stub shaft 133' is supported by the lower transverse bearing plate 38. The idler gear 133 meshes with a driven gear 134 fixed to the lower end of the adjacent tumbling roll shaft 125'. Thus the driving chain 129', as driven by the transverse sprocket supporting shaft 35' of the marshalling assembly, operates to rotate all of the spinner rolls 126 and associated tumbling rolls 125 in unison.

The mixture of objects deposited on the floor of the drop bin 40a, are engaged by the respective advancing paddles 23a and pushed in an upwardly inclined direction from the discharge end of the bin floor, and onto the lower ends of the tumbling rolls 125. The vertical leg 19" of the stationary upper T-shaped member 19 serves to divide the flow of upwardly advancing objects and push them laterally into supporting contact with the upper periphery of the adjacent rotating tumbling rolls 125, whose upper peripheries rotate in a direction away from the adjacent partition forming vertical leg 19" of the stationary T-shaped divider.

The rotative movement of each tumbling roll 125, rolls the objects into contact with the upper surface of the adjacent spinner roll 126, which further aids in spinning the objects during their upwardly inclined advance. Where more than one object is engaged by the facing section 24 of each advancing paddle 23a, the rotating action of the tumbling roll 125 and the adjacent spinning roll 126 serves to effect discard of excess objects, so that only one object is engaged by the facing section 24 of each advancing paddle 23a as it arrives at the upper end of the drop tube 61. Thus each row of upwardly advancing paddles 23a, in cooperative association with its tumbling roll 125 and spinner roll 126, serve to marshall and align the objects in spaced successive order and in a single column before they are discharged into the drop tube 61 of the sensing ring 62. In the case of a potato and stone mixture, the tumbling and spinning agitation of the potatoes and remaining stones during their upwardly inclined advance by the advancing paddles 23a, also serves to rub off clinging soil from the potatoes and stones and to pulverize remaining hard clods of soil so that this debris may drop to ground between the paired tumbling and spinner rolls 125–126.

In cases where all the vines have not been substantially removed by the primary deviners 1 and the transverse secondary sifting conveyors 115, a floating idler roll 47 as previously described may be positioned in rolling contact with each of the spinner rolls 126, with each floating roll 47 mounted on a floating roll shaft 47' suspended by a pair of depending struts 57 supported from transverse bars 56–56' of the framework assembly as previously described. However, where all vines have been substantially removed by the action of the primary deviners 1 and the transverse secondary sifting conveyors 115, a baffle plate 135 as shown in FIG. 19 extending substantially the full length of each spinning roll 126, and whose lower edge is substantially in contact therewith, may be provided to prevent objects from hurdling the spinner rolls 126. Each inclined baffle plate 135 may be supported by a pair of suspension struts 135' fixed to the transverse bars 56–56' of the framework assembly as indicated in FIG. 19.

It will be noted that the arm sections 23a' of the advancing paddles 23a in the modification shown in FIGS. 15, 17, 19 and 20, extend substantially in a horizontal plane, and that the tumbling rolls 125 are positioned directly under each set of horizontally extending arm sections 23a. However, it will be appreciated that advancing paddles 23b which feature downwardly bent arm sections 23b' may be employed as shown in FIG. 24, in which case the adjacent tumbling rolls 125 and spinner rolls 126 would be arranged as shown in this figure. Where downwardly bent arm sections 23b' are employed, it is desirable to provide a floor member 136 positioned between the advancing chain 20a and the adjacent tumbling roll 125. The floor member 136 extends from the discharge end of the floor of the drop bin 40a to a point adjacent the upper end of one of the drop tubes 61. As shown in FIG. 24, this supporting floor member 136 may take the form of an inverted V-shaped member having an inclined floor forming leg 136' positioned directly under each row of inclined paddle arms 23b'. Each V-shaped floor forming member 136 has a vertical attaching leg 136" which may be secured by spaced bolts 137 and associated spacing collars 137' to the depending vertical leg of the adjacent T-shaped support bar 17.

In the arrangement shown in FIG. 24, each tumbling roll 125 and its supporting shaft 125', and its associated spinner roll 126 and its supporting shaft 126', are adjusted in position and elevation to provide an object conducting trough therebetween, and to efficiently cooperate with its row of advancing paddles 23b, but would otherwise be mounted and driven in the same manner as the modification shown in FIGS. 19 and 20. In the modification shown in FIG. 24, the objects driven from the drop bin 40a by the inclined advancing paddles 23b, tumble laterally down the inclined legs 136' of the V-shaped floor member 136 and then tumble and spin in the space between the adjacent tumbling roll 125 and associated spinner roll 126. If more than one object is engaged by the facing section 24 of each advancing paddle 23b, the excess objects would be driven laterally over the downwardly inclined leg 136' of the V-shaped floor member 136, or roll downwardly over the spinner roll 126, toward the bin 40a until again re-engaged by an advancing paddle, and so that each inclined advancing paddle 23b discharges only one object in successive spaced order into the drop tube 61 of the sensing ring 62. A cooperating floating roll 47, operative to remove any of the remaining vines, may be associated with each of the spinner rolls 126 shown in FIG. 24, or alternatively, the baffle plate 135 suspended from the transverse bars 56–56' previously described may be associated with each spinner roll 126 as shown in FIG. 24.

In the modification shown in FIG. 25, the respective arm sections 23b' of the advancing paddles 23b are also arranged in a downwardly inclined position, with each row of inclined arm sections 23b' advancing over the inclined leg 136' of the inverted V-shaped floor member 136 constructed and supported as shown in FIG. 24 and previously described. In the modification shown in FIG. 25, only a tumbling roll 125a is provided for each row of advancing paddles 23b, and when processing a mixture of potatoes and stones the tumbling roll 125a of this modification may have a diameter of three to five inches, centered directly under the facing sections 24 of each row of advancing paddles 23b'. Each of the tumbling rolls 125a of the modification shown in FIG. 25, rotate in the direction of the arrow indicated thereon, and which rotation assists in the elimination of excess objects, so that only one object is advanced by the facing section 24 of each advancing paddle 23b as it arrives at the upper end of the drop tube 61. In this modification, only the shaft 126', without a spinner roll mounted thereon, would be provided as the driving medium for each tumbling roll 125a. Each tumbling roll 125a would be otherwise constructed and mounted in the same manner as the tumbling roll 125 previously described, but is driven in the opposite direction with the upper periphery thereof moving toward the V-shaped floor member 136. An inclined baffle plate 135a, positioned as shown in FIG. 25 and suspended by suspension struts 135' from the transverse bars 56-56' of the framework assembly, is provided to maintain the advancing column of objects in supported position on the adjacent tumbling roll 125a and in tumbling contact with the adjacent baffle plate 135a.

To reduce the number of rolls required for the object advancing and marshalling assembly, and to eliminate gears 132–134 of FIG. 19 and thereby correspondingly reduce the cost thereof, the assembly shown in FIGS. 21–23 may be employed, and is fully operative to perform its intended functions when the tumbling rolls are eliminated and only a single spinner roll is used in association with each row of advancing paddles 23b. In this modification, four paddle supporting chains 20a are employed, each equipped with a paired series of spaced and longitudinaly aligned advancing paddles 23b whose downwardly inclined arm sections 23b' are secured to and extend laterally from opposite sides of each advancing chain 20a, as shown in FIG. 23. The paddle advancing chains 20a, their sprocket drives, and the assembly framework is otherwise generally similar to that shown in FIGS. 15–19, as is evident by referring to FIGS. 21 and 22. The modification shown in FIGS. 21–23 is also equipped with a pair of drop bins 40a, a pair of transverse sifting conveyors 115, and eight object selector and eliminator units 60, as previously described.

In the modification shown in FIGS. 21–23, each T-shaped bar 17 supports a pair of inverted V-shaped floor forming members 136a, each presenting an inclined floor forming leg 136a' which is somewhat wider than the inclined floor forming leg 136' previously described, and has a width sufficient to extend under substantially the entire length of the downwardly inclined paddle arm sections 23b' as shown in FIG. 23. These inclined floor forming legs 136a' in conjunction with the adjacent spinner rolls 126a provide support for the objects as advanced by the row of advancing paddle 23b positioned directly thereabove, and are sufficiently inclined to cause a tumbling movement of the objects as supported thereon and as advanced in an upwardly inclined direction superimposed by the row of advancing paddles 23b.

A single spinner roll 126a is positioned adjacent the outer edge of each row of advancing paddles 23b, and spaced sufficiently therefrom to leave a gap between its periphery and the adpacent side edge of the inclined floor forming leg 136a' of the adjacent inverted V-shaped member 136a. Each spinner roll 126a' is covered with rubber or like gripping material, and when a mixture of potatoes and stones is to be processed, may be made approximately three to five inches in diameter, with a preferred diameter of approximately four inches. The supporting shaft 126' of each spinner roll 126a is positioned in approximately the same inclined plane as the side edge of the adjacent inclined floor forming leg 136a', and is rotated in the direction indicated in FIG. 23. The supporting shaft 126' of each spinner roll 126a is supported by a suitable journal attached to the upper transverse bearing plate 37 as shown in FIG. 19, with the upper end of the shaft 126' provided with a driving sprocket 129 driven by a drive chain 129' as previously described. The lower end of the supporting shaft 126' of each spinner roll 126a is journaled in the lower bearing plate 38.

Since no tumbling rolls are used in this modification, the the lower end of the spinner roll shaft 126' does not require a driving gear to provide a drive for an adjacent tumbling roll. It will also be noted that the modification shown in FIG. 23, is substantially similar to the modification shown in FIG. 24 when the tumbling rolls 125 are eliminated from the modification shown in FIG. 24.

Each spinner roll 126a as shown in FIGS. 21–23 may be provided with means for removing the remaining vines, as by the provision of a floating roll 47 in riding contact therewith, and whose roll shaft 47' is suspended from the transverse bars 56–56' by suspension struts 57 as previously described. Alternatively, each spinner roll 126a may be provided with a baffle plate 135, each of which is supported by a pair of suspension struts 135' extending from the overhead transverse bars 56–56' of the framework assembly. The lower edge of each baffle plate 135 is suspended in close proximity to the periphery of its spinner roll 126a, and prevents objects being tumbled between the spinner roll 126a and the adjacent inclined floor forming leg 136a', from hurdling the spinner roll 126a.

The objects to be classified are pulled from the floor of the drop bin 40a by the inclined advancing paddles 23b and pushed on to the lower end of the inclined floor forming leg 136a'. As the objects are advanced by the facing sections 24 of each row of advancing paddles 23b, excess objects will tumble laterally beyond the reach of the facing sections 24 of the advancing paddles 23b, and rolled downwardly towards the drop bin 40a, to again be picked up by the advancing paddles, and so that each paddle 23b advances only a single object to dropping position at the upper end of its drop tube 61.

In the processing of objects such as a root crop or potatoes, for example, clinging soil is rubbed off from the potatoes and stones, and hard clods are pulverized during advance movement of the paddles 23b, so that the loosened debris sifts to ground in the space between the spinner roll 126a and the adjacent side edge of inclined floor forming leg 136a' of the angular floor member 136a.

The modification illustrated in FIGS. 15–20, the modifications illustrated in FIGS. 24 and 25 and the modification illustrated in FIGS. 21–23, are all highly effective in marshalling potatoes and stones in single file rows, with each potato and stone advanced in columnized spaced relation for discharge into the upper ends of the respective drop tubes 61, in a manner so that the potato selector and stone eliminator units 60 will effectively operate to eliminate all remaining stones from the flow of potatoes before they reach the discharge conveyor 190 at the rear end of the processing system. These advancing and marshalling assemblies also operate to remove clinging soil from the potatoes and stones during their upwardly inclined advance to the drop tubes 61, so that a clean potato product is assured, notwithstanding damp or wet conditions and clinging types of soil. Where vines have been substantially destroyed by chemical and/or mechanical treatment prior to harvesting, the primary deviner 1, together with the transverse secondary sifting conveyors 115, may be amply sufficient to insure removal of all vegetable debris from the potato stream. However, where the vines and vegetable growth is so abundant or tenacious that all of such vegetable debris cannot be effectively removed by the primary deviners 1 and secondary sifting conveyors 115, the spinner rolls 126 or 126a as above described may have the floating deviner rolls 47 in riding contact therewith.

The various forms of marshalling apparatus illustrated in FIGS. 15–25 may be driven from a prime mover 160 which drives a longitudinally extending main power shaft 185 through a clutch assembly 186 controlled by manually manipulated clutch elements 186' and 186" as shown in FIG. 26. The main power shaft 185 drives a main transverse shaft 188 through speed reduction gearing 187, and the shafts 184' and drive sprockets 189' of the primary sifting conveyors 180 may be driven by drive chains 189 from drive sprockets 188' fixed to the main transverse drive shaft 188. The longitudinal drive shaft 191' of the transverse discharge conveyor 190 may be driven by a drive chain 193 trained around a drive sprocket 194 fixed to a secondary longitudinal shaft 195 rotated by a drive chain 196, transfer shaft 197 and drive chain 198, driven from the main longitudinal drive shaft 185. The drive shafts 120' and associated sprockets 120 of the secondary sifting conveyors 115, may be driven through their drive sprockets 124 and drive chains 124'—124' from drive sprockets 124" fixed to the secondary longitudinal drive shaft 195, and which is driven from the main longitudinal drive shaft 185.

As shown in FIGS. 15, 16, 19, 21 and 26, the upper ends of the duplex paddle equipped marshalling chains 20a, are supported and driven by sprockets 35 fixed to a common drive shaft 35' and driven by a drive sprocket 36 fixed to the end of the drive shaft 35' driven by a drive chain 36' trained over the sprocket 36" fixed to the main transverse drive shaft 188 as shown in FIG. 26. As previously explained, the shaft extensions 126' of the spinner rolls 126 as shown in FIGS. 15, 16, 19, 20 and 24, or the shaft extensions 126' of the spinner rolls 126a shown in FIGS. 21, 22 and 23, or the shaft extensions 125' of the tumbling rolls 125a shown in FIG. 25, are each equipped with a drive sprocket 129 around which a drive chain 129' is trained, as shown in FIGS. 15, 19, 21 and 26. The drive chain 129' is driven from sprocket 130 fixed to stub shaft 130' connected by gearing 131 to the marshalling chain supporting shaft 35'. The drive sprockets 66' fixed to the continuously driven rotors of each clutch and brake assembly 70 is connected by drive chain 67 as shown in FIG. 2 to a sprocket 67' fixed to a common transverse shaft 68 as shown in FIG. 26. Thus, in the drive system as shown in FIG. 26, all processing sections of the marshalling apparatus are driven in cooperative synchronism.

The marshalling apparatus of this invention is particularly adapted for association with automatically operating classifying and separating units designed to sense predetermined characteristics of the columnized objects as they individually arrive at the rear end of the marshalling apparatus, and thereupon separate the objects into two or more groups, and of which the classifying and separating unit 60 shown in FIG. 2 is an illustrative example. As a further example, FIGS. 27–34 illustrate another object classifying and separating unit which may be associated with each tumbling roll 125 of the marshalling apparatus shown in FIGS. 15–19 when minor modifications are made thereto.

The modified marshalling apparatus shown in FIGS. 27–34 embraces four continuous object advancing chains 20a, each trained over sprocket 34 rotatably mounted on a stationary idler shaft 34' as shown in FIG. 18. The upper end of each continuous advancing chain 20a is trained over a sprocket 35a as shown in FIG. 29, and all four upper sprockets 35a are fixed to a common driven shaft 35' which has a drive sprocket 36 fixed to one end thereof and driven by chain 36' from the main transverse shaft 188 of the marshalling assembly. Each sprocket 35a is connected to shaft 35' by a grooved or toothed slip clutch 35b which is equipped with laterally extending lugs 35c as shown in FIG. 29, and which are designed to slip into appropriate sockets formed in the side wall of the adjacent sprocket 35a to thereby drive the sprocket, but which will slip out of the sockets when an undue load strain is placed on the sprocket 35a by the marshalling chain 20a.

The upper run of each advancing chain 20a is supported by the T-shaped bar 17 as shown in FIG. 29, whose upper end is supported by block 18 fixed to the cross bar 18' of the marshalling assembly, and whose lower end is supported by a cross plate 38 associated with the framework of the marshalling assembly, as shown in FIGS. 19 and 29. An inverted T-shaped deflector 19 having lateral legs 19' and a vertical leg 19" is suspended over the upper run of each advancing chain 20a. The upper end of the T-shaped deflector 19 is secured to the transverse support plate 37 of the marshalling assembly as shown in FIG. 32, and its lower end is secured to the rear wall 42a of the receiving bin 40a, as shown in FIG. 18. The vertical leg 19" of the T-shaped deflector 19 terminates short of the advanced edge of the bin floor 44a as shown in FIG. 29, and the remaining lateral legs 19" thereof are contoured to form a part of the floor of the bin 40a as heretofore explained. The bin 40a for this modification is constructed as shown in FIGS. 15, 16, 18 and 21 and previously described.

The sensing unit 100 of each alternative selector device is positioned at the upper end of each tumbling roll 125. When each sensing device is influenced by the electrical conductivity of an object passing thereover, the columnized advancing paddles passing thereover, and extending laterally from the opposite sides of each advancing chain 20a, should be made of non-conductive material such as nylon or like plastic. As shown in FIG. 30, each advancing paddle 23c is composed of a non-conductive laterally extending arm 23c' suitably fixed to the adjacent link 21 of the chain 20a as by bolts or rivets, and its advancing face 23c" supports a soft and non-conductive advancing plate 24 made from rubber or the like. The laterally extending advancing paddles 23c travel through holes 42b in the rear wall 42a of the collecting bin 40a, as shown in FIG. 18, and push out the objects forwardly from the bottom wall 44a and 44b of the bin, a fragment of which is shown in FIG. 29. In the event any advancing paddle 23c of the columnized paddles associated with the marshalling chain 20a is blocked in its advance by an object or other obstruction, the lugs 35c of the slip clutch 35b will slip from the sockets of the sprockets 35a, but will remesh with the sprocket when the paddle jamming has been cleared. The sprocket engaging lugs 35c of the slip clutch 35b are so spaced as to drive the marshalling chain 20a and associated paddles 23c in advancing synchronism with the rotative movement of the deflecting paddles 140' of the adjacent selector and eliminator unit as hereafter described.

As shown in FIGS. 27 and 29, a set of marshalling rolls comprising a tumbling roll 125 and a spinner roll 126 positioned at slightly higher elevation, are associated with each column of advancing paddles 23c. The tumbling roll 125 and the associating spinner roll 126 are covered with resilient and non-conductive material such as rubber. The lower end of the shaft 126' which supports the spinner roll 126 and the lower end of the shaft 125' which supports the tumbling roll 125, are suitably journaled in the lower cross plate 38 of the marshalling framework as shown in FIG. 29. The tumbling roll shaft 125' and the spinner roll shaft 126' are driven in unison by a gear 132 fixed to the tumbling roll shaft 125' and a gear 134 fixed to the spinner roll shaft 126', joined together in driving assembly by an idler gear 133. Each spinner roll shaft 126' has an end extension 126" which extends through and is supported by a journal associated with a secondary cross plate 39 forming a part of the marshalling framework. A driving sprocket 39' is secured to each spinner roll shaft extension 126"; the sprockets 39' being driven by a drive chain 39" which may be driven by any suitable connection to the main drive of the marshalling assembly.

The upper end of each tumbling roll shaft 125' is supported by a suitable journal 125" fixed to one leg of a U-shaped bracket 138 supported by the angular cross bar 18' of the marshalling framework, as shown more particularly in FIGS. 32 and 33. Each U-shaped bracket 138 also supports the sensing unit 100 which contains the sensing circuit. The upper end of each spinner roll shaft 126' is supported by a suitable journal fixed to a support bracket 139 which seats on and is secured to the angular cross bar 18' of the marshalling framework as shown in FIG. 31. The objects removed from the collecting bin 40a by the non-conductive advancing paddles 23c are advanced thereby in columnized order along the adjacent tumbling roll 125 and spinner roll 126, so that each columnized advancing paddle 23c will forward advance only a single object over the upper arcuate surface of the sensing unit 100 positioned at the upper end of each tumbling roll 125.

The sensing circuit of each sensing unit 100 is contained within a box-like structure as shown in FIGS. 33 and 34 having a lower box part 101 made of metal or like conductive material, and having a cover part 101' made of non-conductive material and which is arcuately shaped in contour conformity with the upper arcuate face of the tumbling roll 125 with which it is associated. It will thus be appreciated that the individually spaced and columnized objects as shown in FIG. 34, are separately advanced by the successive advancing paddles 23c directly over and in contact with the non-conductive arcuate cover part 101' of the box which contains the sensing circuit, and which functions to control the operation of a magnetic clutch and brake device 85 as shown in FIG. 29. As shown in FIGS. 29 and 33, the upper end of the arcuate covered part 101' merges into a contoured drop nose 102 preferably made of non-conductive material, and which may be molded to present a quarter-sphere surface over which objects as advanced by the paddles 23c may drop. The contoured drop nose 102 is fixed to the adjacent leg of the channel shaped bracket 138 which supports the sensing unit 100.

Each magnetic clutch and brake device 85 operates to rotate an object deflecting paddle wheel 140 which is positioned adjacent the upper end of each spinner roll 126, and when rotated through a prescribed arc, operates to deflect either the conductive or non-conductive object into an adjacent receiving chute 142, as the sensing circuit may indicate. To prevent the columnized objects from hurdling the spinner roll 126, a guide plate 135 as shown in FIG. 29 may be supported over each spinner roll 126 by the upwardly projecting struts 135' of the mashalling framework. The upper end of the deflecting plate 135 has an inwardly curved end 135" as shown in FIG. 29, to baffle any jumping movement of the spaced and columnized objects, and to direct them into sensing relation to the non-conductive arcuate cover 101' of the sensing unit 100.

The object deflecting paddle wheel 140, as shown in FIGS. 27, 29, 31 and 32, is composed of two or more radial extending blades 140' fixed to a paddle wheel shaft 141. The projecting end 141' of the paddle wheel shaft 141 is supported in a bearing block 141" which is fixed to the angular shaped transverse framing bar 56' of the marshalling assembly, as shown in FIG. 32. The paddle wheel shaft 141 is so positioned and oriented that the paddles 140' associated therewith will successively sweep across the drop nose 102 adjacent to the sensing unit 100, at a tilted angle with respect to the cushioning faces 24 of the advancing paddles as shown in FIGS. 29 and 30, when the paddle wheel shaft 141 is rotated.

The mouth end of each receiving chute 142 is positioned directly adjacent the upper end of each spinner roll 126, as shown in FIGS. 27, 28, 29, 31 and 32, and is designed to receive the conductive objects which are deflected into the mouth thereof by the deflecting paddles 140'. The receiving chute 142 is shaped in the form of a tube of rectangular cross-section, and presents a side wall 142' which is directly adjacent the arcuate cover part 101' of the sensing unit 100. The upper end of the side wall 142' has a rectangular port opening 142a whose width is only slightly greater than the width of the deflecting paddle 140'. The clutch and brake device 85 which drives the paddle wheel shaft 141, is so constructed and operated as to normally maintain one of the paddles 140' of the paddle wheel 140 in position to substantially close the port opening 142a of the receiving chute 142, and thus block the entry of objects into the mouth end of the receiving chute. However, when the clutch and brake device 85 is energized to rotate the paddle wheel shaft 141 through an angular segment corresponding to the number of the deflecting paddles 140' which constitute the paddle wheel 140, the deflecting paddle blocking the opening 142a will be swung inwardly across the mouth of the chute 142, and the next succeeding deflecting paddle 140' will sweep across the drop nose 102 adjacent the sensing unit 100 and come to rest in a position to block the entry port 142a.

In addition to the side wall 142' which has the port opening 142a at the upper end thereof, each conductive object receiving chute 142 also presents additional side walls 142" whose upper ends extend substantially above the adjacent spinner roll 126 as shown in FIG. 32, and join with the side wall 142' to provide a chute of rectangular cross section which is bent around the sprocket shaft 35' or other obstructions and terminates directly above the transverse object conveyor 190. Where objects are to be deflected into the chute 142, the interior of the chute may be provided with resilient rubber cushioning and deflecting baffles 143 and 143' as shown in FIG. 32, and which are secured to the side walls 142' and 142" of the chute, and which serve to cushion the fall of the objects dropping onto the transverse conveyor 190.

In the structure shown in FIGS. 27 and 28, a total of eight spinner rolls 126 are employed, with two of the spinner rolls 126 positioned adjacent the opposite longitudinal frame members 11–11' of the marshalling framework, and with the remaining spinner rolls 126 arranged in pairs therebetween. A total of five receiving chutes 142 are required, two of which are positioned adjacent the longitudinal side frame members 11–11'. The other three receiving chutes 142 may be duplex chutes positioned at the ends of the adjacently paired spinner rolls 126. Each duplex receiving chute 142 would present opposite side walls 142' each having a port opening 142a at the mouth end thereof, and its mouth end would be divided into two compartments by a rubber cushioning baffle 144 as shown in FIGS. 27 and 31, which serves to prevent an object deflected by the paddles 140' at one port hole 142a from being thrown through the opposite port hole 142a of the duplex receiving chute. Each vertically extending rubber baffle 144 may be fixedly suspended from a suitable suspension bar 144' secured to the angular cross frame members 56' of the marhalling assembly.

In the modifications shown in FIGS. 31 and 32, the conductive objects are deflected by the deflecting paddle wheel 140 into the offside receiving chutes 142. The non-conductive objects which are not deflected, roll off the drop nose 102 and drop downwardly to ground. The non-conductive objects fall onto an inclined cover plate 145, extending over the transverse conveyor 190 as shown in FIG. 32, and thence deflected to ground and away from the transverse conveyor 190. The inclined cover plate 145 may be supported at the lower end thereof by the side wall 190' of the transverse conveyor 190, and its upper end may be secured to vertically extending straps 145' which are fixed to the lower transverse frame member 12' of the marshalling framework. Each of the chutes 142 which receive conductive objects extends through a conforming hole in the inclined cover plate 145 as shown in FIG. 32 and conducts the conductive objects contained therein directly to the transverse conveyor 190.

A magnetic clutch and brake device 85 is operatively connected to the shaft 141 of each deflecting paddle wheel 140 and functions to intermittently rotate the paddle wheel 140 in successive stages under the control of the sensing unit 100. Each clutch and brake device 85 is contained within a non-magnetic tubular housing 85' which may be fixedly secured against rotation to the adjacent transverse framing plate 37 of the marshalling assembly as shown in FIG. 27.

As shown in FIGS. 27–29, each clutch and brake device 85 includes a cylindrical drive cup 86 formed of magnetic material and designed to rotate within the stationary tubular casing 85', and has a mechanically oscillating shaft 86' extending from the bottom wall thereof. The drive cup shaft 86' extends through the transverse frame plate 37 of the marshalling assembly and is rotatably journaled thereon. The clutch and brake device 85 also includes a clutch rotor 88 formed of magnetic material, which has a clutch shaft 88' extending therefrom which is connected as by a universal joint 141''' to the adjacent end of the paddle wheel shaft 141, as shown more particularly in FIGS. 29 and 32. The clutch rotor 88 is provided with a series of radially extending lug segments 88'' whose outer ends have an end area corresponding to the inner face area of lug sections 86'' extending from the drive cup 86, and correspond in number and spacing to the number and angular spacing of the deflecting paddles 140' associated with the paddle wheel 140, and fit within the inner circumference defined by the corresponding lug sections 86'' of the drive cup 86. Thus, when the drive cup 86 is magnetized and mechanically oscillated, the lug sections 86'' thereof will grip the lug segments 88'' of the clutch rotor 88 to thereby correspondingly rotate the clutch rotor 88 and the paddle wheel 140.

The drive cup 86 contains a magnetic clutch coil wound on a spool 87'' which is placed on a magnetic core. The magnetic clutch core may be formed as an integral part of the bottom wall of the drive cup 86 and oscillates therewith. The lead wires from the clutch coil may be connected to external slip rings 87''' which encircle the drive cup shaft 86'. The slip rings 87''' are connected to direct current input lines whose current flow is controlled by the sensing unit 100 as hereafter described. When the clutch coil contained in the mechanically oscillated drive cup 86 is energized, the drive cup lug sections 86'' will grip the corresponding lug segments 88'' of the rotor 88 to rotate the rotor 88 and paddle wheel 140 in one direction only and in successive stages.

The clutch cup 86 is continuously oscillated clockwise and counter-clockwise through a prescribed angle by mechanical means hereafter described. The angular extent of these oscillations is determined by the number of deflecting paddles 140' associated with the deflecting paddle wheel, and where the paddle wheel 140 is equipped with four deflecting paddles 140' as shown in FIG. 29, the drive cup 86 will be oscillated back and forth through an angle of ninety degrees. The magnetic clutch coil is energized and de-energized in accordance with the controlled impulses received from the sensing unit 100, and when the drive cup 86 is thereby magnetized during one cycle of oscillation, it will operate to rotate the deflecting paddle wheel 140 through an angle of ninety degrees, with resultant sweep of one of its deflecting paddles 140' across the drop nose 102 adjacent to the sensing unit 100 and into fixed residence position at the port opening 142a of the chute 142, and thus block the entry of objects into the chute 142.

To rigidly maintain one of the deflecting paddles 140' in port blocking position so that the object advanced by the pusher paddle 24 is not deflected but is pushed onto the drop nose 102, a magnetic brake coil 89 is telescoped over the clutch shaft 88', as shown more particularly in FIG. 29. The magnetic brake coil 89 has a magnetic core 89' in which the clutch shaft 88' freely rotates. The brake coil 89 is contained within a brake cup having a bottom wall 89'' and a cylindrical body wall 89'''. The magnetic core 89' may be formed integral with the bottom wall 89'' of the brake cup, and the brake cup and the magnetic brake coil 89 contained therein is held against rotation as by screws which secure the end wall of the fixed tubular casing 85' to the bottom wall 89'' of the brake cup. When the brake coil 89 is energized, a braking effect is exerted on the clutch shaft 88' which operates to lock the deflecting paddle wheel 140 against rotation, and maintains one of its deflecting paddles 140' in position to block the adjacent port hole 142a of the chute 142.

The clutch coil 87 contained in the drive cup 86, and the brake coil 89 contained in the surrounding brake cup wall 89''', are alternately energized and de-energized under the control of the sensing unit 100, so that when the mechanically oscillated drive cup 86 is coupled to the clutch rotor 88 by the energization of its clutch coil, the four bladed paddle wheel 140 is rotated through an angle of ninety degrees; and upon de-energization of the clutch coil and simultaneous energization of the brake coil 89, the brake wall 89''' will magnetically lock to the rotor lugs 88'' and thus lock the deflecting paddle wheel 140 against further rotative movement.

As shown in FIGS. 27 and 29, the drive cup 86 is mechanically oscillated through a drive system which may be directly connected to the sprocket shaft 35' by means of which the marshalling chain sprockets 35a are driven through the slip clutch 35b. The driven sprocket shaft 35' has a beveled gear 90 fixed thereto which meshes with the companion bevel gear 90' fixed to a relatively short longitudinally extending shaft 91 having a driven gear 91' fixed thereto. The short shaft 91 is supported by a suitable bracket or gear box 91'' fixed to the adjacent side frame member 11 of the marshalling frame as shown in FIG. 28. A transfer gear 92 supported by suitable stub shaft 92' meshes with the driven gear 91' and with a driven gear 93 fixed to a secondary shaft 93'. One end of the secondary shaft 93' is fixed to a cam arm 94 which has a camming stud 94' projecting therefrom. The cam stud 94' is designed to extend into a vertical slot 94'' formed in the enlarged head section 95' of a horizontally reciprocating bar 95 extending across the rear end of the marshalling assembly as shown in FIGS. 27 and 28, and is supported by suitable guide blocks 95'' fixed to the adjacent transverse framing plate 37 of the marshalling framework.

The drive cup 86 of each clutch and brake device 85 is oscillated by the reciprocating bar 95 through an angle corresponding to the angular spacing of the deflecting paddles 140' of the paddle wheel 140 driven thereby. Where the deflecting paddle wheel 140 has four radially spaced deflecting blades or paddles 140', spaced ninety degrees apart, as shown in FIGS. 27, 31 and 32, the driving cup 86 would be oscillated through an angle of ninety degrees. It will also be noted that alternate paddle wheels 140 are segmentally rotated in the same clockwise direction to push objects into the receiving chute 142 positioned at the right side thereof, while the intermediate deflecting paddle wheels 140 are rotated in a counter-clockwise direction to deflect objects into the rear receiving chute 142 positioned on the left hand side thereof. Therefore, the driving connections between the mechanically oscillated shafts 86' of the alternate drive cups 86, and the shafts 86' of the intermediate drive cups 86, are so connected to the reciprocating bar 95 to accomplish this result.

As shown in FIGS. 27, 28 and 29, the alternate drive cups 86 which segmentally rotate the paddle wheels 140 connected thereto in a clockwise direction, present a lever arm 96 fixed to the terminal end of its drive cup shaft 86' which extends downwardly as shown at the left hand side of FIG. 29, with the lower end thereof connected by hinge pin 97 to the lower end of an upwardly inclined connecting link 98 whose upper end is pivotally connected by hinge pin 99 to the reciprocating bar 95. The shaft 86' of each intermediate driving cup 86 which rotates its paddle wheel 140 in a counter-clockwise direction as shown in the right hand side of FIG. 29, has an upwardly extending lever arm 96' fixed to its terminal end which is connected by hinge pin 97' to one end of a downwardly inclined connecting link 98' whose opposite end is connected by hinge pin 99' to the reciprocating bar 95.

The lever arms 96-96' and the connecting links 98-98' are of such length as to oscillate the respective drive cup shafts 86' through an angle of ninety degrees where four paddles 140' are associated with the paddle wheel 140. It will be appreciated that where the paddle wheel 140 is provided with only two paddle blades 140' spaced 180 degrees apart, or three paddle blades 140' spaced 120 degrees apart, the lever arms 96-96' and associated connecting links 98-98' would be correspondingly modified to oscillate the drive cups 96 and correspondingly rotate the paddle wheels 140 through 180 degree or 120 degree segments.

The speed of segmental rotation of the paddle wheels 140 is so synchronized with the advanced movement of the rubber facing plates 24 of the columnized paddles 23c so as not to interfere with the advance movement of the deflecting paddle 140' across the adjacent drop nose 102. The paddle wheel 140 is segmentally rotated with a quick movement, and so that the wheel blade 140' operating to deflect the conductive object, is progressively swept across the face of the rearwardly inclined resilient facing section 24 of the advancing paddles 23c the moment the advancing paddle has positioned the object adjacent the inner end of the drop nose 102. Striking contact between the wheel blade 140' engaged in deflecting the object, and the paddle face section 24 of the adjacent advancing paddle 23c, is avoided by the rearward inclination of the paddle facing section 24 and the tilted position of the paddle wheel shaft 141 as illustrated in FIGS. 29 and 30.

Rotative synchronization of the paddle wheel 140 and advancing blades 23c is accomplished by proper proportional sizing of the beveled gears 90-90' and the driving and transfer gears 91', 92 and 93. This synchronization of movement is further assured by the provision of the slip clutch 35b associated with each chain driving sprocket 35a which operates to advance the advancing paddles 23c in synchronization with the segmental rotation of the paddle wheels 140. It will be noted that the slip clutch 35b is free to slip in the event any jamming of one of the columnized advancing paddles 23c should occur, but whose sprocket driving lugs 35c are angularly spaced in conformity with the lineal spacing of the advancing paddles 23c.

The marshalling assembly illustrated in FIG. 29 and above described, suggests horizontal advancing paddles 23c, each column of which cooperates with a tumbling roll 125 and an adjacent spinning roll 126. It will be appreciated, however, that the advancing paddles 23c formed of non-conducting material, may be inclined downwardly as well as rearwardly, as in the case of the downwardly inclined advancing paddles 23b shown in FIG. 24, and wherein the tumbling roll 125 and associated spinning roll 126 would be adjusted in elevation as shown in FIG. 24. In this modification, the sensing unit 100 and associated drop nose 102 would be positioned at the upper end of each depressed tumbling roll 125 as heretofore explained, and without change in the driving or manipulating mechanisms shown in FIG. 29.

It will be appreciated also that the advancing paddles 23c shown in FIG. 29 may be bent downwardly and rearwardly to correspond with the advancing paddles 23b shown in FIG. 25, and employing only a tumbling roll 125a associated with the downwardly inclined column of advancing paddles 23c. In this modification, the sensing unit 100 and associated drop nose 102 would be positioned at the upper end of the tumbling roll 125a as heretofore explained, without material change in the driving and manipulating mechanisms shown in FIG. 29.

As a further alternative, the columnized advancing paddles 23c shown in FIG. 29 may also be downwardly as well as rearwardly inclined as shown in FIG. 23, and use only a spinner roll 126a associated with each column of downwardly inclined advancing paddles 23c. In this modification, the sensing unit would have a sloped cover in conformity with the slope of the inclined leg 136a' of the V-shaped member 136a over which the objects are driven by the downwardly sloped advancing paddles 23c, and with a drop nose 102 extending therefrom. In this modification, using only a spinner roll 126a with each column of downwardly inclined paddles 23c, the spinner roll 126a would be driven from the lower end thereof as indicated in FIG. 29.

It is thus evident that various arrangements of tumbling rolls 125 or 125a and/or spinner rolls 126 or 126a, and/or inclined tumbling plates 136 or 136a may be provided in association with a sensing unit 100 and drop nose 102 positioned at the upper end of one of the rolls or tumbling plates, and that the non-conductive advancing paddles 23c may be downwardly inclined in accordance with the requirements of these modifications and within the purview of this invention.

The sensing unit positioned adjacent the upper end of the tumbling roll 125, or tumbling roll 125a, or spinner roll 126a, or inclined leg 136' of the floor member 136, as previously described, contains a sensing circuit, an amplifying circuit and a switching circuit, and which are connected in circuit with each other. The switching circuit is also electrically connected to the clutch coil and brake coil 89 of the magnetic clutch and brake device 85, and is also connected to a cam switch assembly associated with the clutch shaft 88' of the clutch and brake device 85. Direct current, under control of the switching circuit may be supplied to the clutch coil and brake coil 89 by a storage battery.

The sensing unit 100 has a cover part 101' whose outer surface forms a substantially uninterrupted continuation of the upper end of the tumbling roll 125, or tumbling roll 125a, or spinning roll 126 or spinning roll 126a, or inclined lower leg 136' of the floor member 136, so that the objects to be classified make smooth transition across the outer surface of the cover part 101' of the sensing unit 100. As previously explained, the cover part 101' of the sensing unit 100 is formed of non-conducting material such as "Teflon," to insure proper operation of the sensing unit. The sensing unit 100 may contain two or more partitions or non-conducting plates 103 as shown in FIGS. 33 and 34 and on which the elements and components of the sensing circuit, amplifying circuit and switching circuit may be conveniently mounted.

The sensing unit 100 also contains a pair of spaced condenser plates 104 which are positioned directly adjacent the inner face of the cover part 101' of the sensing unit, as shown more particularly in FIGS. 33 and 34, and which are desirably contoured in conformity with the inner surface of the cover part 101'. The spaced condenser plates 104 provide the capacitor portion of a tuned oscillator tank circuit.

The salient pole clutch and brake device shown in FIG. 29, is equipped with a switch operating cam 105 fixed to the clutch shaft 88' which presents two or more equally spaced and radially extending cam lugs 105', equal in number to the paddle blades 140' associated with the deflecting paddle wheel 140. The cam lugs 105' are designed to manipulate the cam plate 105'' during segmental rotation of the switch operating cam 105, to thereby make and break contact with a contact point 105'''.

The slip rings 87''' mounted on the mechanically oscillated shaft 86' of the drive cup 86 supply direct current to the terminals of the clutch coil and the terminals of the brake coil 89 under the control of a flip-flop switch forming a part of the switching circuit of the sensing unit 100.

When a conductive object passes over the arcuate cover 101' of the sensing unit 100, the circuit system therein energizes the clutch coil and locks the clutch 88 to the mechanically driven rotor 86. The rotor 86 rotates the clutch 88 and its shaft 88' until the switch cam 105 closes the switch element 105''' as shown in FIG. 29. When the switch element 105''' closes, the clutch coil is de-energized and the brake coil 89 is energized which prevents further rotation of the clutch rotor 88 and its shaft 88' connected to the paddle wheel 140, with the result that one of its deflecting paddles 140' blocks the entry port 142a of the side discharge chute 142.

A sensing unit 100 containing a transistorized control circuit is provided for each clutch and brake device 85, except that a common power source may be provided for all of the individual transistor circuits. Each of the transistor circuits may be fully contained and sealed within the box part 101 and cover part 101' of the sensing unit 100, and since the transistor circuit is adapted for compact assembly, its sealed housing 101–101' may be made relatively small in size. By the use of the salient pole type of clutch and brake device 85, which can also be compacted in a small space, their housings 85' can also be made relatively small and compact in size. Thus by the use of compactly sized transistor circuits and compactly sized salient pole type clutch and brake device 85, the instrument containing electronic control housings 101–101' and the clutch and brake device housing 85' can be made very compact and light in weight.

When a conductive object passes over the cover part 101' of the sensing unit 100, the energizing current to the brake coil 89 is cut off, and current is switched to the clutch coil. The de-energized brake coil 89 thus releases the clutch rotor 88 with resultant rotation of the paddle wheel 140 in synchronism with the upwardly advancing paddles 23b, to thereby push the conductive object laterally from the cover part 101 or drop nose 102 into the receiving chute 142. At the termination of the ninety degree movement, the four lobed cam 105 fixed to the clutch shaft 88' closes contact 105''' to operate the control circuit to switch current from the clutch coil to the brake coil 89, which then holds the paddle wheel 140 stationary until another conductive object signal is received.

If a non-conducting object is advanced over the cover part 101' of the sensing unit, no signal is received, and the paddle 140 remains locked in stationary position, so that the port blocking paddle 140' directs the non-conductive object to ground discharge over the drop nose 102. Any object travelling along the upper surface of the tumbling roll 125 or 125a, or the spinner roll 126 and 126a, and in contact with barrier 135, will be pushed by the curved end 135'' of the barrier into sensing proximity to the cover part 101' of the sensing unit 100.

Synchronizing adjustments may be made so that the paddle blades 140' of the paddle wheel 140 are segmentally rotated in timed relation to the advancing movement of the marshalling paddles 23b, and so that the deflecting paddle blades 140' swing into deflecting engagement with the conductive object when the advancing paddle 23b has moved the conductive object beyond the cover part 101' of the sensing unit. As shown in FIG. 30, it will be noted that the backward slant of the advancing paddle 23b will reduce the effective rate of a approach of its advancing paddle face 24 with respect to the adjacent edge of the deflecting paddle blade 140', as they continue their respective motions. Since the paddle wheel shaft 141' is set at an inclined angle with respect to the advance movement of the paddle 23b, so that the paddle wheel blades 140' have a component of motion in the direction of conductive object movement, constant clearance is obtained between the rotating paddle wheel blade 140' and the adjacent advancing paddle face 24.

It will also be noted by referring to FIG. 29, that the drive cup 86 of the magnetic clutch and brake device 85 is provided with four lug sections 86'' which are selectively energized by the clutch coil. The clutch cup 86 oscillates back and forth through an angle of ninety degrees in synchronism with the advance movement of each advancing paddle 23b. When the lug sections 86'' of the drive cup 86 are magnetized by the clutch coil, the lug sections 86'' are magnetically coupled to the lug segments 88'' of the clutch rotor 88, which is thereby segmentally rotated in one direction only. Such coupling can only take place when the lug sections 86'' and lug segments 88'' are in alignment. When the clutch coil is demagnetized, the brake coil 89 is magnetized to maintain the paddle wheel 140 locked in fixed port blocking position. When the clutch coil is magnetized, the brake coil 89 is demagnetized, the clutch shaft 88' and the paddle wheel shaft 141 connected thereto are rotated in one direction only. Backward tilt of the advancing paddle face 24, and the skewed position of the paddle wheel shaft 141, may be relatively adjusted so that sufficient clearance is maintained between the advancing paddle face 24 and the adjacent deflecting paddle 140' during their relative movements. Each advancing paddle 23b as shown in FIG. 30 is made of insulating material such as nylon or other tough plastic, so that it has no influence on the sensing unit 100 when passing thereover.

By making minor changes and additions to optional control switches associated with the clutch and brake device 85, positioned exterior to the sensing unit 100, the deflecting paddle wheel 140 may be operated and manipulated to deflect non-conductive objects into the side receiving chute 142, and to block the port opening 142a therein when a conductive object arrives in sensing position and so that the conductive object continues its travel across the drop nose 102 for discharge into a receiving chute.

The control circuit for this arrangement operates to energize the clutch coil so that the mechanically oscillated drive cup 86 segmentally rotates the clutch rotor 88 and the clutch paddle wheel 140 as a normal condition of operation, and to thereby deflect successive objects advanced to the drop nose 102 into the side receiving chute 142, unless further controlled. This further control is provided by means for de-energizing the clutch coil and energizing the brake coil 89 when a conductive object is sensed by the sensing unit 100 and arrives at the drop nose 102, and which condition results in a locking of the paddle blades 140' in a position to block the opening 142a in the side chute 142, with the result that the conductive object continues its travel across the drop nose 102 and into a receiving chute.

The control unit 100 for this circuit also contains a sensing circuit and associated condenser plates 104, an amplifying circuit, and a switching circuit which controls the operation of the clutch and brake device 85, as shown in FIG. 29. The slip rings 87''' are connected to the terminal ends of the clutch coil. One of the slip rings is supplied with direct current, while the other slip ring is connected to a cam switch which includes a cam disc 106 which is fixed to the continuously driven shaft 93' or an extension thereof, as shown in FIG. 29. The continuously rotating clutch control cam 106 has a raised track section of approximately 180° in length, which is designed to manipulate a switch plate 106'' into conducting contact with a contact point 106''' to which one of the clutch lead terminals is connected, while the switch plate 106'' is connected to the flip-flop switch of the switching circuit.

One of the terminals of the brake coil 89 is connected to a direct current source and the other terminal is connected to the switch point 107''' of a brake switch, which includes a continuously rotated cam 107 fixed to the rotating shaft 93' or an extension thereof. The brake switching cam 107 has a raised cam track which is approximately 180° in arcuate extent, and is designed to manipulate a grounded switch plate 107'' positioned to make closed circuit contact with the switch point 107'''. It will be noted that the continuously rotated brake cam disc 107 presents its raised track section in out-of-phase relation to the raised cam track of the clutch control cam 106. Thus, when the raised cam track section of the clutch cam 106 closes the clutch circuit, the brake contact is opened and the brake coil 89 de-energized, with no braking action exerted on the object deflecting wheel 104.

The continuously rotated shaft 93' also has a switching cam 108 secured thereto which presents a raised cam track lug on the perimeter thereof, designed to move its switch plate 108'' into circuit closing contact with the contact point 108'''. The contact point 108''' and the contact plate 108'' are connected to the switching circuit contained in the sensing unit 100. Since the contact lug of the switch cam 108 is of relatively short arcuate length, current flows to the switching circuit for only a short instant during each complete rotation of the switch cam 108.

The clutch control switch comprising the continuously rotated cam disc 106 and associated contact plate 106'' and contact point 106'''; the brake control switch comprising the continuously rotated brake control cam disc 107 and its contact plate 107'', contact point 107'''; and the main control switch comprising the continuously rotating cam disc 108 and associated cam plate 108'' and contact point 108''', may all be grouped together in relatively small space, and contained and protected within a suitable switch housing which may be conveniently mounted on one of the side frame members 11 of the marshalling assembly.

It is apparent that when this control circuit is used, the deflecting paddle wheel 140 continues to segmentally rotate in the same direction and through successive angles of ninety degrees, when a non-conductive object is delivered to the drop nose 102, or when no object is delivered by the adjacent advancing paddle face 24 to the drop nose. However, when a conductive object is delivered by the advancing paddle face 24 to the drop nose 102, the control circuit operates to de-energize the clutch coil so that the drive cup 86 continues to oscillate without driving engagement with the rotor 88, and simultaneously operates to energize the brake coil 89 so as to lock one of the deflecting paddle blades 140' in position to block the port opening 142a in the side chute 142, and so that the conductive object continues its travel over the drop nose 102 and into the product receiving chute.

The marshalling system of this invention is highly effective in assuring lineally spaced and columnized advance of individual objects to a position for classification at the rear end thereof. In principle, the marshalling system provides a series of grooves or channels along which the objects are lineally advanced and columnized in singularizing spaced relation, by the cooperating action of the advancing paddle faces 24 operating in conjunction with the tumbling and/or spinner rolls, and/or the inclined floor members as illustrated in FIGS. 20, 23, 24 and 25. This marshalling assembly will effectively and positively advance the objects in columnized order and in singularized and uniformly spaced relation, for positive classification at the terminal end of the marshalling assembly. In addition, the tumbling action to which the recovered potatoes and like product are subject, removes dirt and soil therefrom, so that a clean crop product is discharged from the harvester.

It will also be noted that the entire marshalling assembly, including the marshalling chains 20 or 20a and associated paddles 23, 23a, 23b or 23c, the tumbling rolls 45, 125 or 125a, the spinner rolls 46, 126 or 126a, the floating deviner rolls 47 or deflecting plates 135, and all drives therefor, are assembled as a unit on a rectangular shaped marshalling frame comprising the side bars 11–11', the end bars 12–12' and 13–13' and assocaited vertical struts 14–14'. The entire marshalling assembly may therefore be manufactured and assembled as an integrated unit.

The marshalling apparatus of this invention is particularly adapted for association with various forms of automatically operated classifying and separating mechanisms and systems to which this apparatus conducts the objects in single file columns and individually spaced order. As an illustrative example, the sensing ring 62 shown in FIG. 2 and above described may be mounted on the marshalling framework and in a position to receive the objects dropped from each column in spaced order, and which controls the operation of magnetic fluid clutch and brake mechanism 70, or a salient pole type clutch and brake device 85 as heretofore described; each of which operates under the control of its own sensing circuit. Similarly, the paddle wheel 140 may be manipulated by either a magnetic fluid clutch and brake mechanism 70 or a salient pole clutch and brake device 85, as preferred. It will also be appreciated, however, that within the purview of this invention, the deflecting paddle 65 shown in FIG. 2, or the deflecting paddle wheel 140 shown in FIG. 29, may be mechanically manipulated by other types of clutches; as for example, a friction type clutch which includes a mechanically driven clutch disc equipped with a clutching electromagnet, and an adjacent friction disc equipped with a braking electromagnet, both under the control of a sensing circuit. It will also be appreciated that compressed air or hydraulic fluid may provide the mechanical means for manipulating the deflecting paddle 65 or for segmentally rotating the deflecting paddle wheel 140, in which case the flow of compressed air or hydraulic fluid to the air or fluid clutch would be controlled by electromagnetic valves, each sensitively controlled by a sensing unit 62 or 100 as heretofore described.

Marshalling apparatus constructed in accordance with this invention, and having selector and classifying mechanism associated therewith, is adapted to be mounted on the framework of a mobile harvester used for harvesting numerous root crops such as potatoes, sugar beets, turnips, onions, and the like, or may be installed in a warehouse for the processing of both root crops and other products grown above ground, or may be installed as a part of a processing system for use in the classification of numerous other organic or inorganic products, articles and objects, as will be evident to those skilled in the art.

While certain novel features of this invention have been disclosed herein and are pointed out in the claims, it will be understood that various omissions, substitutions and changes may be made by those skilled in the art, without departing from the teachings of this invention.

What is claimed is:

1. Apparatus for marshalling and advancing objects of varied shape and size into a single file column and in individually spaced order, including in combination; a receiving area to which the objects are supplied, an object guiding and supporting trough of generally V-shaped cross-section which extends longitudinally at an upwardly inclined angle from said receiving area, said trough being defined between an upper quarter surface of a substantially cylindrical tumbling roll of substantially uniform diameter and an adjacent guide surface extending parallel to the longitudinal and upwardly inclined axis of said tumbling roll, a column of spaced object advancing elements each designed to overlap the object supporting quarter surface of said tumbling roll and having a transverse width which is not substantially more than the transverse width of said trough, means for driving said column of spaced object advancing elements through the receiving area and along said trough to thereby withdraw objects from the receiving area and advance the withdrawn objects along said trough, means for rotating said upwardly inclined tumbling roll while the objects are being advanced by said spaced advancing elements along the upwardly inclined trough to thereby tumble the advanced objects in a manner to effectuate lateral ejection of all but one of the objects from the advancing influence of each object advancing element, and an object return surface positioned along one side of said trough and extending at a substantially corresponding downwardly inclined angle for conducting ejected objects to said receiving area for recycle.

2. Apparatus for marshalling and advancing objects in accordance with claim 1 which includes, a sifting slot defined between the lower edges of said V-shaped trough as defined between the upper quarter surface of said tumbling roll and the adjacent guide surface.

3. Apparatus for marshalling and advancing objects of varied shape and size into a single file column and in individually spaced order, including in combination; a receiving area to which the objects are supplied, an object guiding and supporting trough of generally V-shaped cross-section defined between a pair of uniformly spaced and transversely inclined object guiding surfaces extending longitudinally at an upwardly inclined angle from said receiving area, one of said paired guide surfaces presenting the upper edge thereof at a higher elevation than the upper edge of the companion guide surface and wherein one of the guide surfaces of said V-shaped trough is defined by a portion of the cylindrical surface of a tumbling roll of substantially uniform diameter, a column of spaced object advancing elements each presenting an object advancing face extending over said trough and having a transverse width which is not substantially more in overall width than the transverse width of said trough, means for driving said column of spaced advancing elements through the receiving area and along said trough to thereby withdraw objects from the receiving area and advance the withdrawn objects along said trough, means for rotating said upwardly inclined tumbling roll while the objects are being advanced by said spaced advancing elements along the upwardly inclined trough to thereby tumble the advanced objects in a manner to effectuate lateral ejection of all but one of the objects from the advancing influence of each object advancing element, and an object return surface positioned along one side of the trough forming guide surface of lower elevation and extending at a substantially corresponding downwardly inclined angle for conducting ejected objects to said receiving area for recycle.

4. Apparatus for marshalling and advancing objects in accordance with claim 3 and wherein each of said object advancing elements presents an object advancing face which extends over said trough at an acute angle to the trough forming guide surface of higher elevation and at an obtuse angle to the companion trough forming guide surface of lower elevation.

5. Apparatus for marshalling and advancing objects of varied shape and size into a single file column and in individually spaced order, including in combination; a receiving area to which the objects are supplied, an object guiding and supporting trough extending longitudinally at an upwardly inclined angle from said receiving area, said trough being defined by the cylindrical surface of a tumbling roll of substantially uniform diameter and an adjacent guide surface, a continuous flexible drive member whose upper run extends through said receiving area along one side of said trough for substantially the full length thereof, a series of uniformly spaced object advancing paddles fixed to and extending laterally from said flexible drive member in planular alignment with said trough, each of said paddles having a transverse width which is not substantially more than the transverse width of said trough, means for driving said continuous flexible member to advance said paddles and thereby withdraw objects from the receiving area and advance the withdrawn objects along said upwardly inclined trough, means for rotating said upwardly inclined tumbling roll while the objects are being advanced along said upwardly inclined trough by said paddles to thereby tumble the advanced objects in a manner to effectuate lateral ejection of all but one of the objects from the advancing influence of each paddle, and an object return surface positioned along one side of said trough and extending at a substantially corresponding downwardly inclined angle for conducting ejected objects to said receiving area for recycle.

6. Apparatus for marshalling and advancing objects as defined in claim 5 and wherein the advancing face of each of said paddles is rearwardly inclined with respect to the longitudinal centerline of said trough during its travel along the centerline of the trough.

7. Apparatus for marshalling and advancing objects of varied shape and size into a pair of single file columns and individually spaced order, including in combination; a receiving area to which said objects are supplied, a pair of transversely spaced and substantially parallel object guiding and supporting troughs extending longitudinally at an upwardly inclined angle from said receiving area, each of said upwardly inclined troughs being defined by the cylindrical surface of a tumbling roll of substantially uniform diameter and an adjacent guide surface, a continuous flexible drive member whose upper run extends through said receiving area and between said troughs at a substantially corresponding upwardly inclined angle for substantially the full length thereof, a series of object advancing paddles fixed to and extending laterally from both sides of said flexible drive member in columnized spaced relation and in planular alignment with the respective troughs, each of said paddles having a transverse width which is not substantially more than the transverse width of the trough with which it is associated, means for driving said continuous flexible member and object advancing paddles fixed thereto to thereby withdraw two columns of objects from the receiving area and advance the withdrawn objects along said troughs, means for rotating said tumbling rolls while the objects are being advanced along said upwardly inclined troughs by said spaced and columnized paddles to thereby tumble the advanced objects in a manner to effectuate lateral ejection of all but one of the objects from the advancing influence of each respective paddle, and an object return surface positioned between said troughs and extending at a substantially corresponding downwardly inclined angle for conducting ejected objects to said receiving area for recycle.

8. Apparatus for marshalling and advancing objects as defined in claim 7 and wherein each object advancing paddle is connected to said flexible drive member by a laterally extending arm which is downwardly inclined during the upper run of the flexible drive member, and wherein the advancing face of each object advancing paddle is rearwardly inclined with respect to the longitudinal centerline of its associated trough during the upper run travel thereof.

9. Apparatus for marshalling and advancing objects as defined in claim 8, and wherein said guide surface is in the form of a transversely inclined plate whose upper edge is positioned at a higher elevation than the upper surface of the adjacent tumbling roll.

10. Apparatus for marshalling and advancing objects of varied shape and size into a single file column and in individually spaced order, including in combination; a receiving area to which said objects are supplied, an object guiding and supporting trough extending longitudinally at an upwardly inclined angle from said receiving area and defined between the upper surface of a substantially cylindrical tumbling roll of substantially uniform diameter and an adjacent guide surface extending along one side of said tumbling roll and substantially parallel to the longitudinal axis thereof, a column of spaced object advancing paddles each extending along said upwardly inclined trough and having a transverse width which is not substantially more than the transverse width of said trough, means for driving said column of spaced paddles through the receiving area and along said upwardly inclined trough to thereby withdraw objects from the receiving area and advance the withdrawn objects along said trough, means for rotating said tumbling roll while the objects are being advanced by said spaced paddles to thereby tumble the advancing objects in a manner to effectuate lateral ejection of all but one of the objects from the advancing influence of each respective paddle, and an object return surface positioned along the opposite side of said tumbling roll and extending at a substantially corresponding downwardly inclined angle for conducting ejected objects to said receiving area for recycle.

11. Apparatus for marshalling and advancing objects of varied shape and size into a single file column and in individually spaced order, including in combination; a receiving area to which said objects are supplied, a generally V-shaped object guiding and supporting trough extending longitudinally at an upwardly inclined angle from said receiving area and defined between the upper surface of a substantially cylindrical tumbling roll of substantially uniform diameter and the upper surface of an adjacent spinner roll of substantially uniform diameter extending along one side of said tumbling roll and substantially parallel to the longitudinal axis thereof, a column of spaced object advancing paddles each extending along said upwardly inclined trough and having a transverse width which is not substantially more than the transverse width of said trough, means for driving said column of spaced paddles through the receiving area and along said upwardly inclined trough to thereby withdraw objects from the receiving area and advance the withdrawn objects along said trough, means for rotating said tumbling roll and spinner roll in the same direction while the objects are being advanced by said spaced paddles to thereby tumble the advancing objects in a manner to effectuate lateral ejection of all but one of the objects from the advancing influence of each respective paddle, and an object return surface positioned along the opposite side of said tumbling roll and extending at a substantially corresponding downwardly inclined angle for conducting ejected objects to said receiving area for recycle.

12. Apparatus for marshalling and advancing objects as defined in claim 11, and wherein the upper surface of said spinner roll is positioned at a higher elevation than the upper surface of the adjacent tumbling roll.

13. Apparatus for marshalling and advancing objects as defined in claim 11, and which further includes an object deflecting plate extending above the upper surface of said spinner roll and generally parallel to the longitudinal axis thereof.

14. Apparatus for marshalling and advancing objects as defined in claim 11, and which further includes a deflector roll in riding contact with the upper surface of said spinner roll and extending generally parallel to the longitudinal axis thereof.

15. Apparatus for marshalling and advancing objects of varied shape and size into a single file column and in individually spaced order, including in combination; a receiving area to which the objects are supplied, an object guiding and supporting trough extending longitudinally at an upwardly inclined angle from said receiving area, said trough being formed by a laterally inclined object supporting plate and a cylindrical object supporting roll extending along the lower edge of said laterally inclined object supporting plate and an object deflecting member extending upwardly from said object supporting roll, a continuous flexible drive member whose upper run extends through said receiving area and along the upper edge of said laterally inclined object supporting plate, a series of longitudinally spaced paddle supporting arms fixed to and extending laterally from said flexible drive member, an object advancing paddle fixed to each of said paddle supporting arms and designed to travel along the lower edge of said laterally inclined object supporting plate, means for driving said continuous flexible member to advance said paddles and thereby withdraw objects from the receiving area and advance the withdrawn objects along said upwardly inclined trough, and means for rotating said object supporting roll while the objects are being advanced by said paddles along said upwardly inclined trough to thereby tumble the advanced objects in a manner to effectuate lateral ejection of all but one of the objects from the advancing influence of each paddle.

16. Apparatus for marshalling and advancing objects as defined in claim 15, and wherein each object supporting roll is positioned in laterally spaced relation to the lower edge of said laterally inclined object supporting plate, with the upper part of said roll extending above the lower edge of said plate.

17. Apparatus for marshalling and advancing objects as defined in claim 15, and wherein the upper surface of each object supporting roll is positioned along the lower edge of said laterally inclined object supporting plate, and said object deflecting member extends along the outer edges of said columnized object advancing paddles during the upper-run travel thereof.

References Cited by the Examiner

UNITED STATES PATENTS

| | | | |
|---|---|---|---|
| 432,992 | 7/1890 | Ellsworth. | |
| 1,139,714 | 5/1915 | Parker | 209—101 |
| 2,287,378 | 6/1942 | Hapman | 198—171 |
| 2,313,051 | 3/1943 | Cutler. | |
| 2,356,434 | 8/1944 | Russell. | |
| 2,663,983 | 12/1953 | Fergason | 56—18 |
| 2,792,113 | 5/1957 | Minera | 209—107 |

FOREIGN PATENTS 745,730   2/1956   Great Britain.

EVON C. BLUNK, *Primary Examiner.*

ERNEST A. FALLER, SAMUEL F. COLEMAN,
*Examiners.*

R. J. HICKEY, *Assistant Examiner.*